United States Patent
Uno

(10) Patent No.: US 9,573,597 B2
(45) Date of Patent: Feb. 21, 2017

(54) VEHICLE INFORMATION PROCESSING APPARATUS AND VEHICLE INFORMATION PROCESSING METHOD

(75) Inventor: Satoshi Uno, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/236,262

(22) PCT Filed: Aug. 4, 2011

(86) PCT No.: PCT/JP2011/067835
§ 371 (c)(1),
(2), (4) Date: Jan. 30, 2014

(87) PCT Pub. No.: WO2013/018220
PCT Pub. Date: Feb. 7, 2012

(65) Prior Publication Data
US 2014/0244103 A1     Aug. 28, 2014

(51) Int. Cl.
*B60W 40/09* (2012.01)
*B60W 40/08* (2012.01)
*B60W 50/00* (2006.01)

(52) U.S. Cl.
CPC ............ *B60W 40/09* (2013.01); *B60W 40/08* (2013.01); *B60W 2050/0089* (2013.01)

(58) Field of Classification Search
USPC .................................................. 701/36–124
See application file for complete search history.

(56) References Cited

U.S. PATENT DOCUMENTS

| | | | | |
|---|---|---|---|---|
| 5,428,545 A * | 6/1995 | Maegawa | .......... | G01C 21/3415 701/118 |
| 5,521,823 A * | 5/1996 | Akita | ................. | B60G 17/0195 180/170 |
| 6,205,374 B1 * | 3/2001 | Kljima | ................. | B60G 17/016 307/10.4 |
| 8,140,358 B1 * | 3/2012 | Ling | ..................... | G06Q 40/08 340/439 |

(Continued)

FOREIGN PATENT DOCUMENTS

| CN | 101275840 A | 10/2008 |
|---|---|---|
| DE | 10 2009 045 511 A1 | 4/2011 |

(Continued)

OTHER PUBLICATIONS

International Search Report Issued Sep. 6, 2011 in PCT/JP11/067835 Filed Aug. 4, 2011.

*Primary Examiner* — Jonathan M Dager
(74) *Attorney, Agent, or Firm* — Oblon, McClelland, Maier & Neustadt, L.L.P.

(57) ABSTRACT

Provided is a vehicle information processing apparatus which, in order to link driver operation information to a learning result more smoothly, learns operation information obtained in response to respective vehicle operations performed by the driver in association with locations in which the vehicle operations have been respectively performed. The vehicle information processing apparatus learns a reproducibility of an identical type of operation information in an identical location in accordance with a number of times the identical type of operation information is obtained consecutively in the location.

12 Claims, 8 Drawing Sheets

(56) References Cited

U.S. PATENT DOCUMENTS

| | | | | |
|---|---|---|---|---|
| 8,373,582 B2* | 2/2013 | Hoffberg | ............. | G08G 1/0104 340/539.13 |
| 8,686,845 B2* | 4/2014 | Pilutti | ............. | B60Q 1/52 340/435 |
| 9,377,314 B2* | 6/2016 | Tseng | ............. | G01C 21/26 |
| 2002/0024258 A1* | 2/2002 | Ehrmaier | ............. | F16H 63/483 307/10.1 |
| 2005/0125148 A1* | 6/2005 | Van Buer | ............. | G01C 21/3617 701/468 |
| 2005/0143928 A1* | 6/2005 | Moser | ............. | G06F 19/22 702/19 |
| 2008/0243312 A1* | 10/2008 | Nakamura | ............. | G01C 21/26 701/1 |
| 2009/0005929 A1* | 1/2009 | Nakao | ............. | B60T 7/22 701/33.4 |
| 2009/0082967 A1* | 3/2009 | Hara | ............. | B60H 1/00735 701/530 |
| 2009/0198396 A1* | 8/2009 | Rodriguez | ............. | B60W 10/08 701/22 |
| 2010/0274435 A1* | 10/2010 | Kondoh | ............. | B60W 40/09 701/31.4 |
| 2011/0172864 A1* | 7/2011 | Syed | ............. | B60K 6/445 701/22 |
| 2011/0224893 A1* | 9/2011 | Scofield | ............. | G01C 21/3492 701/119 |
| 2012/0136506 A1* | 5/2012 | Takeuchi | ............. | B60G 17/016 701/1 |
| 2013/0204460 A1 | 8/2013 | Uno | | |
| 2014/0012479 A1* | 1/2014 | Zhao | ............. | B60K 31/0008 701/96 |
| 2014/0015663 A1* | 1/2014 | Uno | ............. | B60W 40/08 340/439 |
| 2014/0142797 A1* | 5/2014 | Otake | ............. | B60W 20/00 701/22 |
| 2014/0309903 A1* | 10/2014 | Otake | ............. | G08G 1/166 701/70 |
| 2014/0354234 A1* | 12/2014 | Sudan | ............. | H02J 7/34 320/127 |
| 2015/0087264 A1* | 3/2015 | Goyal | ............. | G01S 19/34 455/411 |
| 2015/0213555 A1* | 7/2015 | Barfield, Jr. | ............. | H04W 4/046 705/4 |
| 2015/0317847 A1* | 11/2015 | Prakah-Asante | ............. | G07C 5/08 701/1 |
| 2016/0121904 A1* | 5/2016 | Prakah-Asante | ............. | B60W 50/08 701/1 |
| 2016/0123752 A1* | 5/2016 | Kandula | ............. | G01C 21/3469 701/123 |

FOREIGN PATENT DOCUMENTS

| | | |
|---|---|---|
| JP | 5 58200 | 3/1993 |
| JP | 6 208699 | 7/1994 |
| JP | JP 2008-275575 A | 11/2008 |
| JP | 2009 053731 | 3/2009 |
| JP | 2009 103570 | 5/2009 |
| JP | 2009 276293 | 11/2009 |
| WO | 2012 049767 | 4/2012 |

* cited by examiner

| | | NUMBER OF STOPS | | | | | | | | | |
|---|---|---|---|---|---|---|---|---|---|---|---|
| | | 1 | 2 | 3 | 4 | 5 | 6 | 7 | 8 | 9 | 10 |
| NUMBER OF PASSAGES | 1 | 100% | | | | | | | | | |
| | 2 | 50% | 100% | | | | | | | | |
| | 3 | 33% | 67% | 100% | | | | | | | |
| | 4 | 25% | 50% | 75% | 100% | | | | | | |
| | 5 | 20% | 40% | 60% | 80% | 100% | | | | | |
| | 6 | 17% | 33% | 50% | 67% | 83% | 100% | | | | |
| | 7 | 14% | 29% | 43% | 57% | 71% | 86% | 100% | | | |
| | 8 | 13% | 25% | 38% | 50% | 63% | 75% | 88% | 100% | | |
| | 9 | 11% | 22% | 33% | 44% | 56% | 67% | 78% | 88% | 100% | |
| | 10 | 10% | 20% | 30% | 40% | 50% | 60% | 70% | 80% | 90% | 100% |

A SIDE ← | → B SIDE

| | | NUMBER OF STOPS | | | | | | | | | |
|---|---|---|---|---|---|---|---|---|---|---|---|
| | | 1 | 2 | 3 | 4 | 5 | 6 | 7 | 8 | 9 | 10 |
| NUMBER OF PASSAGES | 1 | 1 | | | | | | | | | |
| | 2 | 3 | 1 | | | | | | | | |
| | 3 | 7 | 2 | 1 | | | | | | | |
| | 4 | 11 | 6 | 1 | 2 | | | | | | |
| | 5 | 15 | 10 | 5 | 1 | 2 | | | | | |
| | 6 | 19 | 14 | 9 | 4 | 1 | 2 | | | | |
| | 7 | 23 | 18 | 13 | 8 | 3 | 1 | 2 | | | |
| | 8 | 27 | 22 | 17 | 12 | 7 | 2 | 1 | 3 | | |
| | 9 | 31 | 26 | 21 | 16 | 11 | 6 | 1 | 2 | 3 | |
| | 10 | 35 | 30 | 25 | 20 | 15 | 10 | 5 | 1 | 2 | 3 |

A SIDE ← | → B SIDE

FIG. 4

PATTERNS OF 80%/10 OPERATIONS

42

[OPERATION NUMBER] LARGEST CONSECUTIVE NUMBER     [OPERATION NUMBER] LARGEST CONSECUTIVE NUMBER

PATTERN 1 2 3 4 5 6 7 8 9 10     PATTERN 1 2 3 4 5 6 7 8 9 10

1  ○××○○○○○○○→7      22  ○○○○××○○○○→4
2  ○×○×○○○○○○→6      23  ○○○○×○×○○○→4
3  ○×○○×○○○○○→5      24  ○○○○×○○×○○→4
4  ○×○○○×○○○○→4      25  ○○○○×○○○×○→4
5  ○×○○○○×○○○→4      26  ○○○○×○○○○×→4
6  ○×○○○○○×○○→5      27  ○○○○○××○○○→5
7  ○×○○○○○○×○→6      28  ○○○○○×○×○○→5
8  ○×○○○○○○○×→7      29  ○○○○○×○○×○→5
9  ○○××○○○○○○→6      30  ○○○○○×○○○×→5
10 ○○×○×○○○○○→5      31  ○○○○○○××○○→6
11 ○○×○○×○○○○→4      32  ○○○○○○×○×○→6
12 ○○×○○○×○○○→3      33  ○○○○○○×○○×→6
13 ○○×○○○○×○○→4      34  ○○○○○○○××○→7
14 ○○×○○○○○×○→5      35  ○○○○○○○×○×→7
15 ○○×○○○○○○×→6      36  ○○○○○○○○××→8
16 ○○○××○○○○○→5           ↑
17 ○○○×○×○○○○→4         LEARNING
18 ○○○×○○×○○○→3          START
19 ○○○×○○○×○○→3
20 ○○○×○○○○×○→4
21 ○○○×○○○○○×→5
   ↑
LEARNING
START

FIG. 5

BREAKDOWN OF LARGEST CONSECUTIVE NUMBERS IN PATTERNS  43

| CONSECUTIVE NUMBER | NUMBER OF APPEARANCES | |
|---|---|---|
| 8 | 8 | (LARGEST CONSECUTIVE NUMBER) |
| 7 | 4 | |
| 6 | 7 | |
| 5 | 10 | |
| 4 | 11 | (MOST FREQUENT CONSECUTIVE NUMBER) |
| 3 | 3 | (SMALLEST CONSECUTIVE NUMBER) |

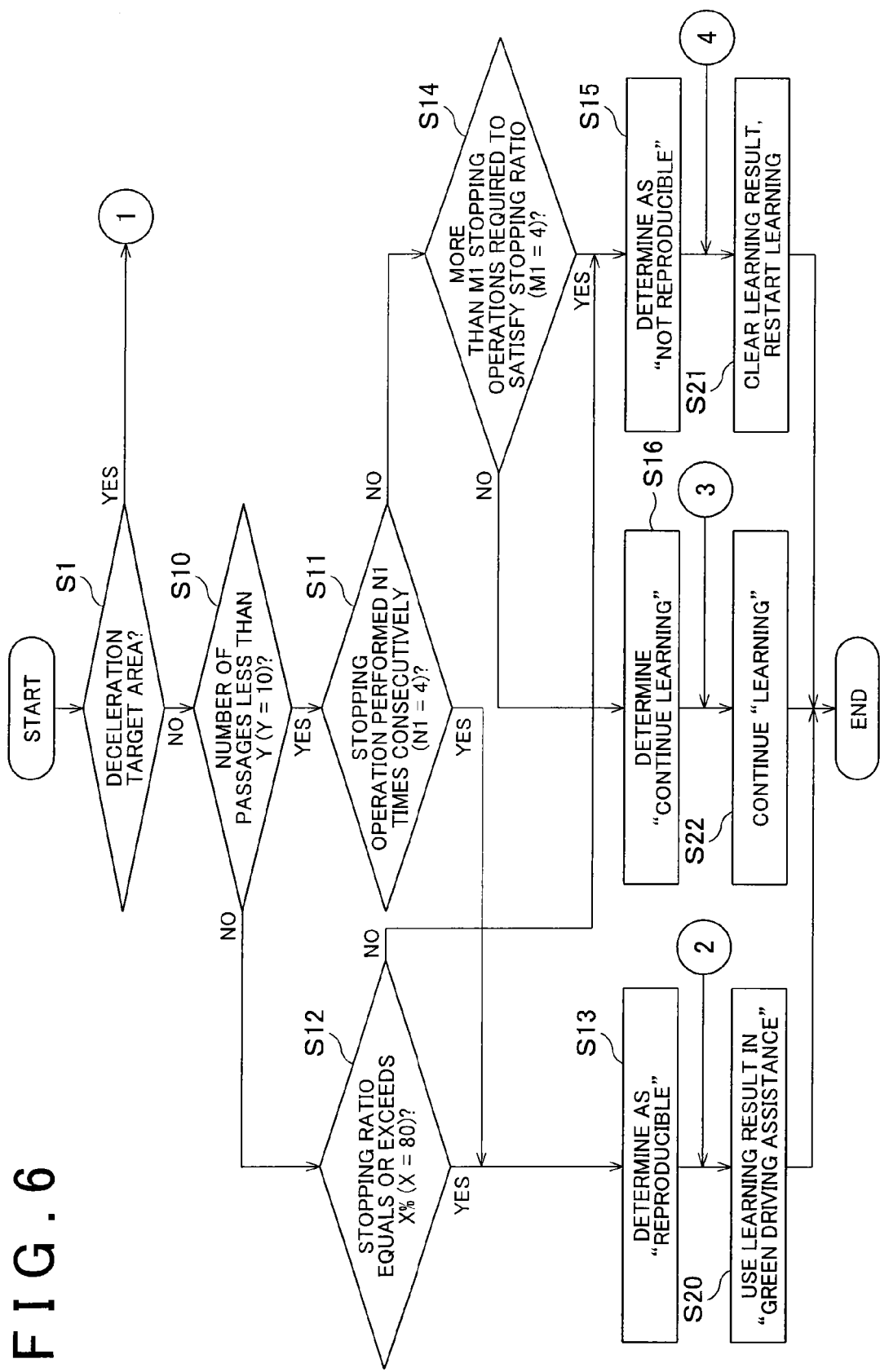

VEHICLE INFORMATION PROCESSING APPARATUS AND VEHICLE INFORMATION PROCESSING METHOD

TECHNICAL FIELD

The invention relates to a vehicle information processing apparatus and a vehicle information processing method for processing operation information obtained on the basis of a vehicle operation performed by a driver driving a vehicle.

BACKGROUND ART

In a conventional technique, a vehicle operation performed by a driver is learned, and a learning result is used in various ways. Examples of apparatuses using this type of technique include an apparatus described in Patent Document 1.

The apparatus described in Patent Document 1 is provided with driver operation variation detecting means for detecting variation in a driver operation (a vehicle operation) performed by a driver driving a vehicle, and position information obtaining means for obtaining information indicating a position of the vehicle when the driver operation variation detecting means detects variation in the driver operation. The apparatus is also provided with map information creating means for storing variation in the driver operation in association with position information obtained at the time of the variation in the driver operation. In other words, in this apparatus, when variation is detected in a driver operation, map information is created by associating the variation in the driver operation with the position information obtained at that time. In so doing, a volume of stored map information can be reduced in comparison with a case where map information is created by storing information relating to a driver operation automatically at predetermined time intervals. According to a further function of this apparatus, when position information corresponding to new driver operation variation information is within a range of a predetermined position from position information corresponding to existing driver operation variation information, and both the new driver operation variation information and the existing driver operation variation information are of an identical type, the position information corresponding to the existing driver operation variation information is updated by the position information corresponding to the new driver operation variation information. In other words, driver operation variation information of an identical type is stored singly within the range of the predetermined position in the map information, and as a result, increases in the volume of the map information are suppressed even when the driver performs a vehicle operation repeatedly.

Patent Document 1: Japanese Patent Application Publication No. 2009-103570

SUMMARY OF THE INVENTION

Incidentally, when learning relating to a vehicle operation performed by the driver is completed and newly obtained operation information based on the vehicle operation performed by the driver differs from operation information obtained as a learning result in an identical position, the new operation information is normally handled as a failure case. In reality, however, operation information that differs from operation information obtained as a learning result is often operation information based on a vehicle operation that has been modified appropriately in accordance with variation in the habits of the driver, variation in a road shape, and so on. During driving assistance based on this type of vehicle operation learning in particular, a considerable amount of time is required for the new driver operation information to be reflected in the existing driver operation information from which the learning result was derived.

The invention has been designed in consideration of these circumstances, and an object thereof is to provide a vehicle information processing apparatus and a vehicle information processing method with which driver operation information can be linked to a learning result more smoothly.

Means for solving the problems described above, as well as actions and effects thereof, are described below.

To achieve the object described above, a vehicle information processing apparatus provided by the invention learns operation information obtained in response to respective vehicle operations performed by a driver in association with locations in which the vehicle operations have been respectively performed, wherein vehicle information processing apparatus learns a reproducibility of an identical type of operation information in an identical location in accordance with a number of times the identical type of operation information is obtained consecutively in the location.

To achieve the object described above, a vehicle information processing method provided by the invention is a method in which operation information obtained in response to respective vehicle operations performed by a driver is learned in association with locations in which the vehicle operations have been respectively performed, including the steps of: counting a number of times an identical type of operation information is obtained consecutively in an identical location; and learning a reproducibility of the identical type of operation information in the location in accordance with the calculated number of times.

According to this configuration or method, the reproducibility of the operation information is learned on the basis of the number of times operation information of an identical type is obtained consecutively in an identical location, or in other words a number of consecutive acquisitions of operation information of an identical type in an identical location, and therefore a number of pieces of operation information required to perform learning in a single location can be set at a number corresponding to the number of consecutive acquisitions. For example, when a vehicle operation performed by the driver is modified appropriately in accordance with variation in the habits of the driver, variation in a road shape, and so on, a number of pieces of operation information that must be obtained before the modified vehicle operation is learned as a valid vehicle operation, or in other words before the vehicle operation is set as a learning result, corresponds to the number of consecutive acquisitions. Therefore, the number of pieces of operation information that must be obtained to learn the modified operation information can be reduced in comparison with a case where learning is performed on the basis of a proportion of accumulated operation information obtained in the past. As a result, a delay in reflecting appropriately modified operation information in the learning result due to the effect of previously accumulated operation information is prevented. Hence, by performing learning on the basis of the number of consecutive acquisitions, the reproducibility of appropriate operation information is learned smoothly in a short period of time even in the case of operation information obtained for the first time and appropriately modified operation information. In other words, a period required for the vehicle information processing apparatus to start driving assistance in relation to operation information obtained for the first time or appropriately modified operation information can be shortened, and as a result, smooth driving assistance can be provided.

It is typically believed that newer operation information reflects current circumstances more accurately and is therefore of higher importance, while older operation information is more likely to deviate from current circumstances and is therefore of lower importance. Further, highly reproducible operation information is more likely to be obtained consecutively from the first time the operation information is obtained. Hence, by performing reproducibility learning on the basis of the number of consecutive acquisitions, an appropriate reproducibility learning result is maintained even when old operation information is not used or the effect thereof is reduced.

Furthermore, when proportion-based learning is performed, an accumulation of a predetermined number of pieces of operation information is required as a parameter, but by employing the number of consecutive acquisitions as a determination reference, the reproducibility can be learned at a point where the number of consecutive acquisitions is reached, regardless of whether or not the predetermined number of pieces of operation information has accumulated. For example, by setting the number of consecutive acquisitions at a "number at which it is estimated that the proportion serving as the determination reference would be reached at the predetermined number during proportion-based learning", the reproducibility can be learned on the basis of a smaller number of pieces of operation information than the predetermined number. Note that by performing a determination on the basis of the number of consecutive acquisitions when the predetermined number has not been reached, the likelihood of reaching the proportion serving as the determination reference when the number of pieces of operation information reaches the predetermined number increases in comparison with a case where the determination is made using a proportion based on a total number up to that point.

Moreover, the number of pieces of operation information required for learning can be suppressed to the number of consecutive acquisitions, and therefore an amount of information required for learning can be reduced.

In a preferred configuration, the location is set as a location constituted by a predetermined range that includes a location in which the operation information is obtained for a first time.

A preferred method further includes a step of setting the location as a location constituted by a predetermined range that includes a location in which the operation information is obtained for a first time, this step being executed prior to the step of counting the number of times the identical type of operation information is obtained consecutively.

According to this configuration or method, location setting is performed on the basis of the operation information, and therefore the location in which reproducibility learning is to be performed can be set with greater flexibility. Further, the location is set as a location constituted by a predetermined range that includes the location in which the operation information was obtained, and therefore a shift in a position of a vehicle due to a road condition, positional deviation due to a position detection precision, and so on can be dealt with favorably. Furthermore, since the predetermined range is handled as a single location, a situation in which a large number of reproducibility learning locations are set in proximity to each other within a small range is prevented from occurring, and therefore an increase in information is suppressed.

In a preferred configuration, when the location is a location in which a specific vehicle operation is required, the vehicle information processing apparatus modifies the number of times operation information of an identical type to the specific vehicle operation is obtained consecutively, which is used to learn the reproducibility of the operation information.

A preferred method further includes a step of, on the condition that the location is a location in which a specific vehicle operation is required, modifying the number of times operation information of an identical type to the specific vehicle operation is obtained consecutively, which is used to learn the reproducibility of the operation information.

According to this configuration or method, when a vehicle operation of an identical type to a specific required vehicle operation is learned in a location requiring the specific vehicle operation, the number of consecutive acquisitions used to learn the reproducibility of the corresponding operation information is modified. For example, in a location requiring a temporary stop, where the driver must perform a stopping operation, the number of consecutive acquisitions used to learn the reproducibility of the stopping operation may be reduced.

In a preferred configuration, when a number of passages through an identical location exceeds a predetermined number, the vehicle information processing apparatus learns the reproducibility of the operation information on the basis of a proportion of the number of times operation information of an identical type is obtained in the predetermined number of newest passages.

In a preferred method, in the learning step, on the condition that a number of passages through an identical location exceeds a predetermined number, the reproducibility of the operation information is learned on the basis of a proportion of the number of times operation information of an identical type is obtained in the predetermined number of newest passages.

According to this configuration or method, when the number of passages through an identical location reaches a predetermined number at which proportion-based learning is possible, the reproducibility of the operation information is learned on the basis of the predetermined number of newest passages. Hence, learning is performed on the basis of a number of pieces of operation information corresponding to the predetermined number even during proportion-based learning, and therefore the number of pieces of operation information used for learning is suppressed.

In a preferred configuration, the operation information is information obtained on the basis of a deceleration operation performed on a vehicle by the driver.

In a preferred method, a deceleration operation performed on a vehicle by the driver is obtained as the operation information.

According to this configuration or method, information used to assist a deceleration operation, which is the operation required as the vehicle operation, can be provided. In a hybrid vehicle, an electric vehicle (EV), and so on in particular, an amount of regenerative power can be increased by extending a period in which power is regenerated on the basis of deceleration assistance, and as a result, an improvement in energy use efficiency can be obtained.

In a preferred configuration, the vehicle information processing apparatus is installed in a vehicle.

In a preferred method, the respective steps are performed in the vehicle.

According to this configuration or method, assistance information provided by the vehicle information processing apparatus can be used easily in the vehicle installed with the apparatus.

To achieve the object described above, a vehicle information processing apparatus provided by the invention provides information required for driving assistance on the basis of a vehicle operation performed by a driver, wherein the vehicle information processing apparatus provides the information required for the driving assistance when an identical type of vehicle operation is executed by the driver consecutively at least a predetermined number of times in an identical location.

According to this configuration, information required for driving assistance is provided when a vehicle operation of an identical type is executed in an identical location consecutively at least a predetermined number of times, or in other words on the basis of a consecutive number of executions of an identical type of vehicle operation in an identical location. In a case where the vehicle operation performed by the driver is modified appropriately in accordance with variation in the habits of the driver, variation in the road shape, and so on, for example, driving assistance is performed when the modified vehicle operation is executed consecutively at least the predetermined number of times. Accordingly, the number of vehicle operations that must be obtained before driving assistance is started can be reduced in comparison with a case where driving assistance is performed on the basis of a proportion of accumulated past information. As a result, a delay in the driving assistance performed in relation to the appropriately modified vehicle operation due to the effects of previously accumulated vehicle operations and so on is prevented. Hence, by providing driving assistance based on the number of consecutive executions, driving assistance can be provided in relation to an appropriate vehicle operation in a short period of time even in the case of a vehicle operation obtained for the first time or an appropriately modified vehicle operation.

It is typically believed that newer vehicle operations reflect current circumstances more accurately and are therefore of higher importance, while older vehicle operations are more likely to deviate from current circumstances and are therefore of lower importance. Further, highly reproducible vehicle operations are more likely to be executed consecutively from the first time the vehicle operation is executed. Hence, the provision of appropriate driving assistance information is maintained even when information relating to old vehicle operations is not used or the effect thereof is reduced during the driving assistance.

Furthermore, when the driving assistance information is provided on the basis of a proportion, a predetermined number of vehicle operations is required as a parameter, but by setting a number of consecutive executions as the determination reference, the driving assistance information can be provided at a point where the number of consecutive executions is reached, regardless of whether or not the predetermined number of vehicle operations has been executed. For example, by setting the number of consecutive executions at a number at which it is estimated that the proportion serving as the determination reference will be reached at the predetermined number, the driving assistance information can be provided on the basis of a smaller number of vehicle operations than the predetermined number. Note that by determining whether or not driving assistance is required on the basis of the number of consecutive executions when the predetermined number has not been reached, the likelihood of reaching the proportion serving as the determination reference when the number of vehicle operations reaches the predetermined number increases in comparison with a case where the proportion is estimated on the basis of a total number up to that point.

Moreover, the number of vehicle operations that must be executed in order to provide the driving assistance information is suppressed to the number of consecutive executions, and therefore the number of pieces of information accumulated in relation to the vehicle operation can be reduced.

BRIEF DESCRIPTION OF THE DRAWINGS

FIG. 2 is a graph illustrating learning performed by the vehicle information processing apparatus shown in FIG. 1.

FIG. 3 is a graph illustrating the learning performed by the vehicle information processing apparatus shown in FIG. 1.

FIG. 4 is a graph illustrating the learning performed by the vehicle information processing apparatus shown in FIG. 1.

FIG. 5 is a graph illustrating the learning performed by the vehicle information processing apparatus shown in FIG. 1.

FIG. 6 is a flowchart showing procedures of a part of processing relating to the learning performed by the vehicle information processing apparatus shown in FIG. 1.

FIG. 8 is a view illustrating a transition of a learning condition of the vehicle information processing apparatus shown in FIG. 1, wherein FIG. 8A is a conceptual diagram conceptually illustrating a condition in which learning is started or finished, FIG. 8B is a conceptual diagram conceptually illustrating a condition in which learning is underway, and FIG. 8C is a conceptual diagram conceptually illustrating a condition in which learning is complete.

MODES FOR CARRYING OUT THE INVENTION

A specific embodiment of a vehicle information processing apparatus according to the invention will now be described with reference to FIG. 1.

Figure 1:
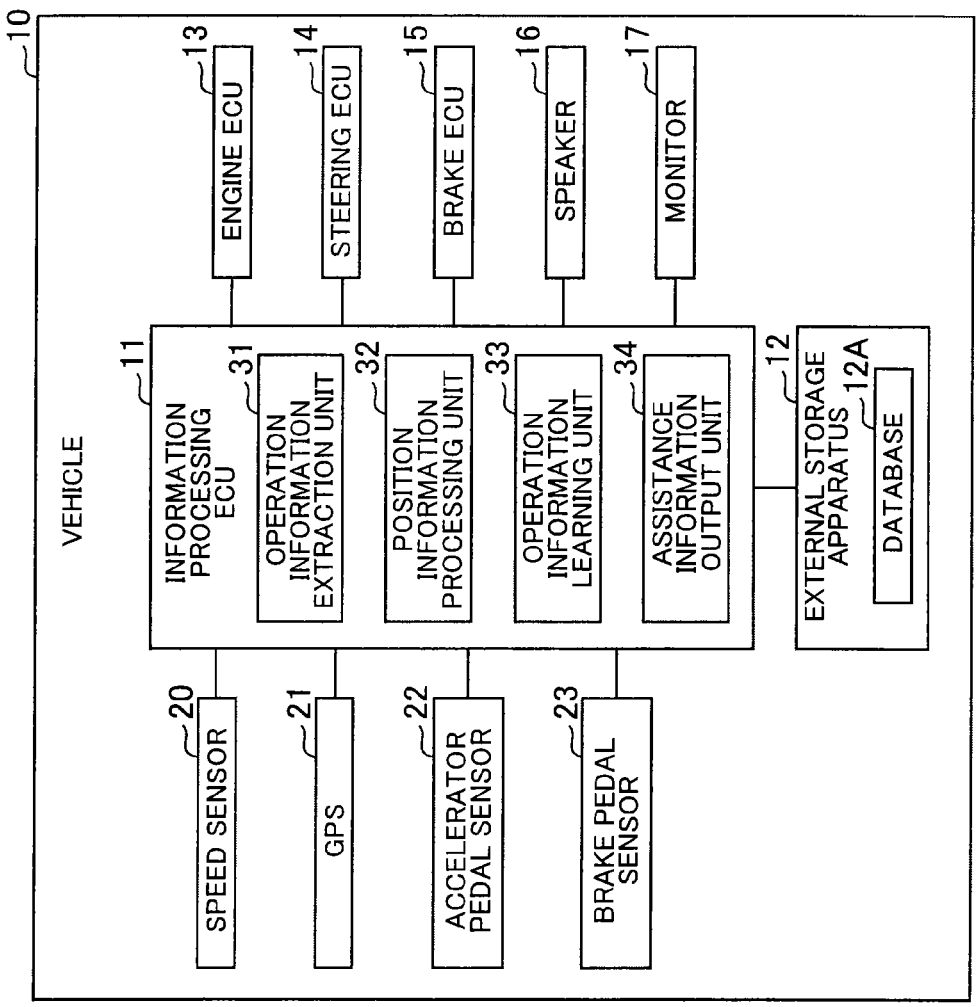
FIG. 1 is a schematic block diagram showing a configuration of a specific embodiment of a vehicle information processing apparatus according to the invention.

As shown in FIG. 1, a vehicle 10 is installed with an information processing electronic control unit (ECU) 11 serving as the vehicle information processing apparatus, and an external storage apparatus 12 connected communicably to the information processing ECU 11. Further, an engine ECU 13, a steering ECU 14, and a brake ECU 15 are installed in the vehicle 10 and respectively connected communicably to the information processing ECU 11.

The external storage apparatus 12 is constituted by a non-volatile storage apparatus such as a hard disk drive (HDD). The external storage apparatus 12 is provided with a database 12A, and various information used during information processing by the information processing ECU 11 is registered in the database 12A. For example, "operation information", which is information registered on the basis of a vehicle operation performed by a driver, and a "learning area", which is information indicating a predetermined range including a position in which the vehicle operation was executed, are registered in the database 12A in association with each other. Furthermore, "specific position information", which is information indicating a position such as a temporary stop line, a railway crossing, or a sharp curve in which a stopping operation or a deceleration operation is required of the driver, is registered in the database 12A as a so-called "deceleration target area" together with "specific operation information" indicating the vehicle operation required in that position. Note that information indicating a specific position in which a stopping operation is required and information indicating a specific position in which a deceleration operation is required may be registered in the database 12A separately as a "stopping target area" and a "deceleration target area", respectively.

The engine ECU 13 is an ECU that performs operation control on an engine of the vehicle 10. An accelerator pedal sensor 22 that detects an accelerator depression amount, a sensor that detects an intake air amount, and so on are connected to the engine ECU 13 together with drive circuits for various devices, such as a throttle valve drive circuit and a fuel injection valve drive circuit. The engine ECU 13 learns an operating condition and so on of the engine on the basis of detection signals input from the respective sensors, and outputs command signals to the drive circuits for the various devices. Thus, engine operation control is implemented via the engine ECU 13. Note that in this embodiment, when a deceleration assistance signal, for example, is transmitted to the engine ECU 13 as a driving assistance signal from the information processing ECU 11, the engine ECU 13 executes deceleration assistance control including stopping the vehicle 10. As the deceleration assistance control, the engine ECU 13 may perform control to suppress an engine rotation speed, control to halt a fuel supply to the engine (a fuel cut), and so on.

The steering ECU 14 is an ECU that performs steering assistance control through power steering control or the like. A steering angle sensor, a speed sensor 20, and so on are connected to the steering ECU 14 together with a steering assist apparatus such as a power steering apparatus. The steering ECU 14 learns a steering angle on the basis of detection signals input from the respective sensors and so on, and outputs a command signal to the steering assist apparatus. When outputting the command signal, the steering ECU 14 may take into account a speed of the vehicle 10. Thus, steering assist control is implemented via the steering ECU 14. Note that in this embodiment, when a deceleration assistance signal, for example, is transmitted to the steering ECU 14 as the driving assistance signal from the information processing ECU 11, the steering ECU 14 executes deceleration assistance control including stopping the vehicle 10. As the deceleration assistance control, the steering ECU 14 may perform steering assistance during braking on a slippery road surface and so on.

The brake ECU 15 is an ECU that controls a brake apparatus of the vehicle 10. Various sensors such as the speed sensor 20 and a brake pedal sensor 23 are connected to the brake ECU 15. The brake ECU 15 causes the vehicle 10 to generate braking force by controlling the brake apparatus of the vehicle 10 on the basis of signals from the various sensors. More specifically, the brake ECU 15 calculates a required braking force on the basis of the speed of the vehicle 10 learned on the basis of the signal from the speed sensor 20, a signal indicating a brake depression amount from the brake pedal sensor 23, and so on, and then controls the brake apparatus. Note that in this embodiment, when a deceleration assistance signal, for example, is transmitted to the brake ECU 15 as the driving assistance signal from the information processing ECU 11, the brake ECU 15 executes deceleration assistance control including stopping the vehicle 10. As the deceleration assistance control, the brake ECU 15 may perform preparatory braking control, assist braking control, and so on.

Further, a speaker 16 and a monitor 17 serving as output apparatuses (user interfaces) that output driving assistance information and the like to the driver are electrically connected to the information processing ECU 11.

A display screen of the monitor 17 is constituted by a liquid crystal display or the like. The monitor 17 displays images corresponding to data input from the information processing ECU 11. As a result, the information processing ECU 11 can output the driving assistance information via the monitor 17 in the form of images prompting the driver to pay attention, such as cautionary displays and warning displays.

The speaker 16 is a device that generates voices and sounds, and outputs voices and sounds corresponding to data input from the information processing ECU 11. As a result, the information processing ECU 11 can output the driving assistance information via the speaker 16 in the form of sounds prompting the driver to pay attention, such as cautionary sounds and warning sounds.

Furthermore, the speed sensor 20 that detects the speed of the vehicle 10, a global positioning system (GPS) 21 that detects a position of the vehicle 10, the accelerator pedal sensor 22 that outputs the accelerator pedal depression amount, and the brake pedal sensor 23 that outputs the brake pedal depression amount are electrically connected to the information processing ECU 11.

The speed sensor 20 is a sensor used to detect the vehicle speed. The speed sensor 20 detects a rotation speed of an axle or a vehicle wheel, for example, and outputs a signal corresponding to the detected rotation speed to the information processing ECU 11. Thus, the information processing ECU 11 can learn a current speed and a movement distance of the vehicle 10. In this embodiment, the speed of the vehicle 10 is used to detect "newest operation information" based on a latest vehicle operation performed by the driver. For example, acceleration is used to detect an acceleration operation, and deceleration is used to detect a deceleration operation.

The GPS 21 receives a GPS satellite signal in order to detect the position of the vehicle 10, and detects a current position on the basis of the received GPS satellite signal. Information indicating the current position detected by the GPS 21 is output to the information processing ECU 11. Thus, the information processing ECU 11 can learn the current position of the vehicle 10. Further, the information processing ECU 11 can detect an advancement direction of the vehicle 10 on the basis of temporal variation in the current position detected by the GPS 21. In this embodiment, the current position of the vehicle 10 is used as "operation position information" obtained when the driver executes the current vehicle operation.

The accelerator pedal sensor 22 detects an operation of the accelerator pedal by the driver and the accelerator pedal depression amount, and outputs a signal indicating the detected operation and the depression amount to the information processing ECU 11. In this embodiment, the accelerator pedal depression amount is used to detect the "newest operation information" based on the latest vehicle operation performed by the driver. For example, depression of the accelerator pedal is used to detect an acceleration operation.

The brake pedal sensor 23 detects an operation of the brake pedal by the driver and the brake pedal depression amount, and outputs a signal indicating the detected operation and the depression amount to the information processing ECU 11. In this embodiment, the brake pedal depression amount is used as the "newest operation information" based on the latest vehicle operation performed by the driver. For example, depression of the brake pedal is used to detect a deceleration operation.

The information processing ECU 11 is constructed about a microcomputer including a calculation apparatus, an internal storage apparatus, and so on. In the information processing ECU 11, various types of information processing based on various data and programs stored in the internal storage apparatus and the external storage apparatus 12 are executed by the microcomputer. In this embodiment, a program (a learning program) for learning a reproducibility of the "newest operation information" is executed by the information processing ECU 11. In other words, the information processing ECU 11 uses the learning program to learn, on the basis of the "newest operation information" and the "operation position information" indicating the position in which the vehicle operation corresponding to the "newest operation information" was executed, the reproducibility of the "newest operation information" within the "learning area" that includes the "operation position information".

In more detail, the information processing ECU 11 is provided with an operation information extraction unit 31 that detects the "newest operation information" and the "operation position information" and a position information processing unit 32 that sets the "learning area" in response to execution of the learning program by the calculation apparatus. The information processing ECU 11 is also provided with an operation information learning unit 33 that learns the reproducibility of the "newest operation information" within the "learning area" and an assistance information output unit 34 that outputs driving assistance information on the basis of a learning result corresponding to the "learning area" including the current position in response to execution of the learning program by the calculation apparatus.

The operation information extraction unit 31 detects the "newest operation information" on the basis of signals from the various sensors. For example, the operation information extraction unit 31 detects (obtains) an acceleration operation as the "newest operation information" after detecting "acceleration" from the signal of the speed sensor 20 and detecting pedal "depression" from the signal of the accelerator pedal sensor 22. Further, for example, the operation information extraction unit 31 detects (obtains) a deceleration operation as the "newest operation information" after detecting "deceleration" from the signal of the speed sensor 20 and detecting pedal "depression" from the signal of the brake pedal sensor 23. Furthermore, after detecting the "newest operation information", the operation information extraction unit 31 obtains the "operation position information" indicating the position in which the vehicle operation corresponding to the operation information was performed on the basis of the signal from the GPS 21.

The position information processing unit 32 obtains the "newest operation information" and the "operation position information" from the operation information extraction unit 31. The position information processing unit 32 then determines whether or not the "operation position information" is included in the "deceleration target area" registered in the database 12A. More specifically, the position information processing unit 32 compares the position indicated by the "operation position information" with a range indicated by the "deceleration target area" registered in the database 12A, and when the position indicated by the "operation position information" is included in the range indicated by the "deceleration target area", sets "priority" as a value of "determination information" used to determine a learning level. When the position indicated by the "operation position information" is not included in the range indicated by the "deceleration target area", on the other hand, the position information processing unit 32 sets "normal" as the value of the "determination information". In other words, when the types of information that can be used for learning include only the "newest operation information" and the "operation position information", "normal" is set in the "determination information", but when the "deceleration target area" and so on are added to the types of information that can be used for learning, "priority" is set in the "determination information".

Further, the position information processing unit 32 associates the "learning area" including the position indicated by the "operation position information" with the "newest operation information". More specifically, the position information processing unit 32 compares the position indicated by the "operation position information" with the range of a "learning area" registered in the database 12A, and when the position indicated by the "operation position information" is included in the range of the "learning area", associates the "learning area" with the "newest operation information" as the "learning area" of the "newest operation information". When the position indicated by the "operation position information" is not included in the range of any of the "learning areas" registered in the database 12A, on the other hand, the position information processing unit 32 creates a "learning area" constituted by a predetermined range including the "operation position information" on the basis of the "operation position information", and associates the created "learning area" with the "newest operation information" as the "learning area" of the "newest operation information".

The operation information learning unit 33 obtains the "newest operation information", the "learning area", and the "determination information" from the position information processing unit 32, and learns the reproducibility of the "newest operation information" within the "learning area" on the basis of the obtained "newest operation information", "learning area", and "determination information". Note that since the "newest operation information" is based on the latest vehicle operation performed by the driver, learning thereof is equal to learning the reproducibility of the latest vehicle operation performed by the driver.

In more detail, the operation information learning unit 33 performs "learning start processing", "learning continuation processing", "learning execution processing", and "learning cancellation processing" in accordance with a learning condition in the "learning area" corresponding to the "newest operation information".

(Learning Start Processing)

The "learning start processing" is processing performed when the "learning area" does not match any of the "learning areas" registered in the database 12A. In the "learning start processing", an area in which the "learning area" associated with the "newest operation information" and "registered operation information" corresponding to the "learning area" can be registered is secured in the database 12A, whereupon the "learning area" and the "newest operation information" are registered in the secured area. As a result, a storage area corresponding to the new "learning area" is secured in the database 12A, and the new "learning area" and "newest operation information" are registered in the secured area.

Note that a plurality of "operation information" can be registered in time series order in the "registered operation information", and therefore the "newest operation information" accumulates in the "registered operation information" every time the vehicle 10 passes through the associated "learning area". Accordingly, the "registered operation information" is constituted by either a single piece of "newest operation information" or a single piece of "newest operation information" and one or more pieces of "past operation information".

(Learning Continuation Processing)

The "learning continuation processing" is processing performed when the "learning area" matches a "learning area" registered in the database 12A. In the "learning continuation processing", the "newest operation information" is added to the "registered operation information" corresponding to the "learning area" registered in the database 12A. In other words, the "newest operation information" is added to an existing "learning area". Note that when the "newest operation information" is added to an existing "learning area", the existing "newest operation information" that was newest prior to registration becomes one step older in time series order, and is therefore managed as the newest "past operation information". Thus, every time "newest operation information" is added, the one or more pieces of existing "past operation information" are managed respectively as pieces of information that are one step older. Note that in this embodiment, an upper limit is set on the number of pieces of "operation information" accumulated in the "registered operation information". More specifically, a total number of pieces of "newest operation information" and "past operation information" corresponding to a single "learning area" is limited to ten. Accordingly, when the number of pieces of "past operation information" reaches the upper limit, the operation information learning unit 33 deletes the "past operation information" exceeding the upper limit every time "newest operation information" is added.

(Learning Execution Processing)

The "learning execution processing" is processing performed to learn the reproducibility within the "learning area" of an "assistance candidate operation" serving as a vehicle operation to be assisted on the basis of the "registered operation information" corresponding to the "learning area". Incidentally, the "operation information" includes a plurality of types of operation information, such as a deceleration operation and an acceleration operation, among which operation information of an identical type corresponds to a single type of operation information selected from the plurality of types, for example the "deceleration operation" or the "acceleration operation". Note that the types of "operation information" may be classified as desired in accordance with a focus point. For example, the "deceleration operation" may be segmented using speed regions, for example, as a reference. Further, the "assistance candidate operation" is an operation selected from the most numerous single type of operation information among the "newest operation information" and "past operation information" registered in the "registered operation information".

When it is learned that the reproducibility of the "assistance candidate operation" within the "learning area" is high, the "assistance candidate operation" is registered in the database 12A during the "learning execution processing" as an "assistance subject operation", i.e. a vehicle operation to be assisted in the "learning area". Thus, the operation information learning unit 33 also learns the "assistance subject operation" corresponding to the "learning area". Hence, by referring to the "learning area" retrieved as the "learning area" corresponding to the current position of the vehicle 10, the information processing ECU 11 obtains the "assistance subject operation" corresponding to the "learning area" from the database 12A.

When it is learned that the reproducibility of the "assistance candidate operation" within the "learning area" is low, on the other hand, an "assistance subject operation" is not set in the database 12A in the "learning execution processing". If an "assistance subject operation" is already set in the database 12A, the set "assistance subject operation" is deleted from the database 12A. Thus, the operation information learning unit 33 also learns when no "assistance subject operation" corresponds to the "learning area". Hence, by referring to the "learning area" retrieved as the "learning area" corresponding to the current position of the vehicle 10, the information processing ECU 11 obtains information indicating that no "assistance subject operation" corresponds to the "learning area" from the database 12A.

The reproducibility of the "assistance candidate operation" is learned on the basis of the "operation information" registered in the "registered operation information". In other words, the operation information learning unit 33 selects the "assistance candidate operation" from the "registered operation information" corresponding to the "learning area" serving as the reproducibility learning subject.

The operation information learning unit 33 then learns whether or not the selected "assistance candidate operation" is reproducible. In this embodiment, the operation information learning unit 33 performs at least one of two types of learning, namely so-called "proportion-based learning" and so-called "consecutive number-based learning", to determine whether or not there is the reproducibility.

(Proportion-Based Learning)

The operation information learning unit 33 performs the "proportion-based learning" on the basis of a proportion of a number of pieces of operation information corresponding to the "assistance candidate operation" to a total number of pieces of operation information registered in the "registered operation information". More specifically, when the number of vehicle operations corresponding to the "assistance candidate operation" equals or exceeds a predetermined proportion, it is learned that the "assistance candidate operation" is reproducible, but when the number of vehicle operations corresponding to the "assistance candidate operation" is smaller than the predetermined proportion, it is learned that the "assistance candidate operation" is not reproducible. In other words, in the "proportion-based learning" according to this embodiment, whether or not there is the reproducibility is learned on the basis of the proportion of the number of pieces of operation information corresponding to the "assistance candidate operation" among the ten pieces of operation information. For example, when the proportion of the number of pieces of operation information corresponding to the "assistance candidate operation" among the ten pieces of operation information is "80%" or more, the operation information learning unit 33 learns that the "assistance candidate operation" is reproducible, but when the proportion of the number of pieces of operation information is lower than "80%", the operation information learning unit 33 learns that the "assistance candidate operation" is not reproducible. Note that when the number of pieces of operation information registered in the "registered operation information" is smaller than ten, the operation information learning unit 33 does not perform the "proportion-based learning". Conversely, when the number of pieces of operation information registered in the "registered operation information" is larger than ten, the operation information learning unit 33 performs the "proportion-based learning" on the basis of the newest ten pieces of operation information.

(Consecutive Number-Based Learning)

The operation information learning unit 33 performs the "consecutive number-based learning" on the basis of a number of consecutively registered pieces of operation information corresponding to the "assistance candidate operation" in the operation information registered in the "registered operation information", i.e. a number of times the operation information is obtained (detected) consecutively. In other words, during the "consecutive number-based learning", whether or not there is the reproducibility is learned on the basis of a number of times the vehicle operation corresponding to the "assistance candidate operation" in the "operation information" registered in the "registered operation information" is performed consecutively. More specifically, the number of consecutive vehicle operations corresponding to the "assistance candidate operation" is compared with a "predetermined consecutive number" for use during reproducibility learning, and when the number of consecutive vehicle operations equals or exceeds the "predetermined consecutive number", it is learned that the "assistance candidate operation" is reproducible. When the number of consecutive vehicle operations is smaller than the "predetermined consecutive number", on the other hand, it is learned that the "assistance candidate operation" is not reproducible. Here, the "predetermined consecutive number" for use during reproducibility learning is a consecutive number used during reproducibility learning to determine whether or not learning is complete, and is constituted by a consecutive number of pieces of operation information of the same type.

For example, when "stopping operation", "stopping operation", "stopping operation", "no operation", and "stopping operation" are registered in the "registered operation information" as five pieces of operation information, the "assistance candidate operation" is the "stopping operation", and the consecutive number of times the corresponding vehicle operation (the "stopping operation") has been performed is three. Hence, the operation information learning unit 33 learns that the "assistance candidate operation" (the "stopping operation"), which has been performed consecutively three times, is reproducible when the "predetermined consecutive number" for use during reproducibility learning is set at three, for example, and learns that the "assistance candidate operation" is not reproducible when the "predetermined consecutive number" is set at four, for example.

When "normal" is set as the "determination information" of the position information processing unit 32, a "normal determination consecutive number" is applied to the "predetermined consecutive number" for use during reproducibility learning, but when "priority" is set as the "determination information" of the position information processing unit 32, a "priority determination consecutive number" is applied. The "normal determination consecutive number" and "priority determination consecutive number" used during reproducibility learning are set in advance in the external storage device 12 or the like, but may be calculated respectively on the basis of a program or the like.

Note that the "consecutive number-based learning" is performed when the number of pieces of operation information included in the "registered operation information" registered in association with the "learning area" is smaller than ten. However, the "consecutive number-based learning" may be performed in place of the "proportion-based learning" when the number of pieces of operation information included in the "registered operation information" is equal to or larger than ten.

(Learning Cancellation Processing)

The "learning cancellation processing" is processing in which a determination (learning) is performed as to whether or not to continue reproducibility learning in the "learning area", and required processing is performed in accordance with the determination. Note that the determination performed during this processing may also be expressed as learning. When it is determined during the "learning cancellation processing" that reproducibility learning in the "learning area" is not to be continued, or in other words that learning is to be canceled, the operation information learning unit 33 frees the area secured in the database 12A for the "learning area", or in other words deletes the "learning area" in which it has been determined that learning is to be canceled from the database 12A together with the "registered operation information", the "assistance candidate operation", the "determination information", and so on associated with the "learning area". When, on the other hand, it is determined during the "learning cancellation processing" that reproducibility learning in the "learning area" is to be continued, the operation information learning unit 33 maintains the area secured in the database 12A for the "learning area".

Thus, the operation information learning unit 33 determines (learns) whether to continue or cancel learning in relation to the "learning area". In this embodiment, the operation information learning unit 33 performs at least one of two determinations (learning processes), namely a so-called "proportion-based determination" and a so-called "consecutive number-based determination", to determine (learn) whether or not the cancel learning.

(Proportion-Based Determination)

The operation information learning unit 33 performs the "proportion-based determination" on the basis of the proportion of the number of pieces of operation information corresponding to the "assistance candidate operation" to the total number of pieces of operation information registered in the "registered operation information". Note that in this embodiment, the number of pieces of operation information registered in the "registered operation information" is set at ten. Hence, in the "proportion-based determination", whether or not there is the reproducibility is learned on the basis of the proportion of the number of pieces of operation information corresponding to the "assistance candidate operation" among the ten pieces of operation information. Accordingly, when the number of vehicle operations corresponding to the "assistance candidate operation" equals or exceeds a predetermined proportion, the operation information learning unit 33 determines that learning in relation to the "learning area" is to be continued, but when the number of vehicle operations corresponding to the "assistance candidate operation" is smaller than the predetermined proportion, the operation information learning unit 33 determines that learning in relation to the "learning area" is to be canceled. For example, when the proportion of the number of pieces of operation information corresponding to the "assistance candidate operation" among the ten pieces of operation information is "80%" or more, the operation information learning unit 33 determines that learning in relation to the "learning area" is to be continued, but when the proportion of the number of pieces of operation information is lower than "80%", the operation information learning unit 33 determines that learning in the "learning area" is to be canceled. Note that when the number of pieces of operation information registered in the "registered operation information" is smaller than ten, the operation information learning unit 33 does not perform the "proportion-based learning". Conversely, when the number of pieces of operation information registered in the "registered operation information" is larger than ten, the operation information learning unit 33 performs the "proportion-based learning" on the basis of the newest ten pieces of operation information.

(Consecutive Number-Based Determination)

The operation information learning unit 33 performs the "consecutive number-based determination" on the basis of a number of consecutive pieces of operation information corresponding to the "assistance candidate operation" required for the "assistance candidate operation" to reach a predetermined proportion of the operation information registered in the "registered operation information". Note that a "learning continuation proportion" serving as a reference for continuing learning is set as a proportion of operation information corresponding to the "assistance candidate operation" to the "registered operation information", and a value thereof is set at or above "80%". In more detail, when, during the "consecutive number-based determination", the proportion of the "registered operation information" occupied by the operation information corresponding to the "assistance candidate operation" is smaller than "80%", the determination as to whether or not to continue learning in the "learning area" is made on the basis of a smallest consecutive number of pieces of operation information corresponding to the "assistance candidate operation" required subsequently for the proportion that is currently under "80%" to reach or exceed "80%". In other words, the operation information learning unit 33 compares the number of consecutive pieces of operation information required for the proportion of operation information corresponding to the "assistance candidate operation" to reach or exceed "80%" with a "predetermined consecutive number" for determining cancellation, and when the number of consecutive pieces of operation information is equal to or smaller than the "predetermined consecutive number" for determining cancellation, determines that learning is to be continued. When the number of consecutive pieces of operation information exceeds the "predetermined consecutive number" for determining cancellation, on the other hand, the operation information learning unit 33 determines that learning is to be canceled. For example, when "stopping operation", "stopping operation", "stopping operation", "no operation", and "no operation" are registered in the "registered operation information" as five pieces of operation information, the "assistance candidate operation" is the "stopping operation", and the current proportion of the "stopping operation" is "60%". At this time, the number of consecutive "stopping operations" required subsequently for the current proportion to reach "80%" is five (=8/10). Hence, the operation information learning unit 33 determines that learning in the "learning area", in which the required consecutive number is five, is to be continued when the "predetermined consecutive number" for determining cancellation is five, for example, and determines that learning in the "learning area" is to be canceled when the "predetermined consecutive number" for determining cancellation is four, for example.

Incidentally, when "normal" is set as the "determination information" of the position information processing unit 32, a "normal determination consecutive number" is applied to the "predetermined consecutive number" for determining cancellation, but when "priority" is set as the "determination information" of the position information processing unit 32, a "priority determination consecutive number" is applied. The "normal determination consecutive number" and "priority determination consecutive number" used in the learning cancellation determination are set in advance in the external storage device 12 or the like, but may be calculated respectively on the basis of a program or the like.

Note that the "consecutive number-based determination" is performed when the number of pieces of operation information included in the "registered operation information" registered in association with the "learning area" is smaller than ten. However, the "consecutive number-based determination" may be performed in place of the "proportion-based determination" when the number of pieces of operation information included in the "registered operation information" is equal to or larger than ten.

The assistance information output unit 34 outputs driving assistance information corresponding to the current position of the vehicle 10 in accordance with the content registered in the database 12A. For this purpose, the current position of the vehicle 10 is input successively into the assistance information output unit 34. When the current position of the vehicle 10 is input, the assistance information output unit 34 searches the database 12A to determine whether or not a "learning area" including the current position exists. When a "learning area" including the current position is not registered in the database 12A, the assistance information output unit 34 does not output driving assistance information corresponding to the current position. When a "learning area" including the current position is registered in the database 12A, on the other hand, the assistance information output unit 34 refers to the "assistance subject operation" corresponding to the "learning area", and outputs the "assistance subject operation" set therein as the driving assistance information. For example, when the "deceleration operation" is set as the "assistance subject operation", the assistance information output unit 34 outputs a deceleration assistance signal as a driving assistance signal corresponding to the deceleration operation, and when the "acceleration operation" is set as the "assistance subject operation", the assistance information output unit 34 outputs an acceleration assistance signal as a driving assistance signal corresponding to the acceleration operation. Further, when learning is underway or the like such that no vehicle operation is set as the "assistance subject operation", an assistance signal is not output.

Note that when a "learning area" including the current position of the vehicle 10 exists in the database 12A but the operation information extraction unit 31 has not detected any "newest operation information" in relation to the "learning area", the assistance information output unit 34 provides the operation information learning unit 33 with information such as "no operation", for example, indicating that no "operation information" has been detected in the "learning area". More specifically, when the vehicle 10 passes through the "learning area" without performing either an acceleration operation or a deceleration operation, the operation information extraction unit 31 cannot detect "operation information" in the "learning area". Hence, the assistance information output unit 34 issues "no operation" as the "newest operation information" relating to the "learning area", whereby the operation information learning unit 33 can learn that the "newest operation information" in the current "learning area" is "no operation".

Next, the reproducibility learning performed by the operation information learning unit 33 in relation to the "assistance candidate operation" and the learning cancellation determination will be described with reference to FIGS. 2 to 5. Note that this embodiment focuses on driving assistance provided in relation to the "stopping operation", and therefore the "newest operation information" is divided into two types, i.e. either information relation to the "stopping operation" or information relating to another operation. Further, it is assumed that the "assistance candidate operation" is the "stopping operation". Moreover, the number of pieces of "operation information" used by the operation information learning unit 33 during reproducibility learning is set at a maximum of the ten newest pieces of information.

In the "learning execution processing", whether or not there is the reproducibility of the "stopping operation" is learned on the basis of a largest consecutive number of "stopping operations" among the ten newest pieces of operation information registered in the "registered operation information" corresponding to the "learning area". Note that in the "proportion-based learning", it is learned that the "stopping operation" is reproducible when the proportion of the "stopping operation" relative to the ten pieces of operation information is "80%" or more, and in this case the "stopping operation" is set as the "assistance subject operation". When the proportion of the "stopping operation" is smaller than "80%", on the other hand, it is learned that the "stopping operation" is not reproducible, and in this case the "stopping operation" is not set as the "assistance subject operation".

A graph 40 shown in FIG. 2 is a tabular graph sectioned into vertical columns and horizontal rows, wherein a number of passages by the vehicle 10 is shown in the vertical columns and a number of stops, or in other words a number of "stopping operations" performed during the passages is shown in the horizontal rows. Further, the graph 40 is sectioned substantially into left and right sections by a thick line, wherein the left side serves as an A side and the right side serves as a B side. In other words, the graph 40 shows proportions of the "stopping operation" to the number of passages of the vehicle 10 through the "learning area", wherein proportions less than "80%" are shown on the A side and proportions equaling or exceeding "80%" are shown on the B side.

Hence, as shown on the graph 40, in a case where the number of pieces of operation information included in the "registered operation information" is less than ten and the number of passages through the "learning area" is one, the proportion of the "stopping operation" in the "registered operation information" reaches or exceeds "80%" when the number of "stopping operations" is one. Likewise, the number of "stopping operations" required for the proportion of the "stopping operation" in the "registered operation information" to reach or exceed "80%" is two when the number of passages is two, three when the number of passages is three, four when the number of passages is four, four or more when the number of passages is five, and five or more when the number of passages is six. Furthermore, the number of "stopping operations" required for the proportion of the "stopping operation" in the "registered operation information" to reach or exceed "80%" is six or more when the number of passages is seven, seven or more when the number of passages is eight, and eight or more when the number of passages is nine.

Assuming, for example, that when the number of pieces of operation information included in the "registered operation information" is smaller than ten, a proportion of "80%" is used during reproducibility learning, if other information is registered in the "registered operation information" after it has been learned that the "stopping operation" is reproducible, with the result that the proportion of the "stopping operation" falls below "80%", the learning result may change to a result indicating that the "stopping operation" is not reproducible. It may therefore be said that in this and similar cases, a favorable learning result is not obtained.

In response to this problem, generation patterns of the "stopping operation" in cases where the proportion of the "stopping operation" reaches "80%" when the number of pieces of operation information included in the "registered operation information" is ten were investigated, as shown in FIG. 4. A list 42 in FIG. 4 shows thirty-six patterns in which the proportion of the "stopping operation" reaches "80%" as patterns "1" to "36". Note that on the list 42, the "stopping operation" is indicated by a white circle (an "O" mark), other operations are indicated by a cross (a "x" mark), and the number of consecutive "stopping operations", or in other words a number of consecutive "O" marks, is indicated as a largest consecutive number. Also note that the first "stopping operation", or in other words the first "O" mark, indicates the start of learning, and information previous thereto is not used in the learning and the determination.

As shown in FIG. 4, the "stopping operation" may be performed consecutively in the thirty-six patterns by which the proportion of the "stopping operation" reaches "80%". In other words, when eight of the ten pieces of operation information denote the "stopping operation" and only two pieces denote other operations, the largest consecutive number of "stopping operations" is any number between a maximum of eight (pattern "36") and a minimum of three (patterns "12", "18", and "19"). In more detail, in patterns "1" to "8", a first other operation occurs second, and a second other operation occurs third in pattern "1" and successively one operation later in the subsequent patterns. In patterns "9" to "15", the first other operation occurs third, and the second other operation occurs fourth in pattern "9" and successively one operation later in the subsequent patterns. In patterns "16" to "21", the first other operation occurs fourth, and the second other operation occurs fifth in pattern "16" and successively one operation later in the subsequent patterns. In patterns "22" to "26", the first other operation occurs fifth, and the second other operation occurs sixth in pattern "22" and successively one operation later in the subsequent patterns. In patterns "27" to "30", the first other operation occurs sixth, and the second other operation occurs seventh in pattern "27" and successively one operation later in the subsequent patterns. In patterns "31" to "33", the first other operation occurs seventh, and the second other operation occurs eighth in pattern "31" and successively one operation later in the subsequent patterns. In patterns "34" and "35", the first other operation occurs eighth, and the second other operation occurs ninth in pattern "34" and tenth in pattern "35". In pattern "36", the first other operation occurs ninth and the second other operation occurs tenth.

To summarize the number of consecutive "stopping operations" in the thirty-six patterns, as shown on a list 43 in FIG. 5, respective numbers of appearances of the largest consecutive numbers can be broken down as follows: eight consecutive "stopping operations" appear in one pattern; seven consecutive "stopping operations" appear in four patterns; six consecutive "stopping operations" appear in seven patterns; five consecutive "stopping operations" appear in ten patterns; four consecutive "stopping operations" appear in eleven pattern; and three consecutive "stopping operations" appear in three patterns. In other words, the largest consecutive number of "stopping operations" is eight, a most frequent consecutive number of "stopping operations" is four, and the smallest consecutive number of "stopping operations" is three. Further, as regards proportions of the patterns included in the thirty-six patterns, the proportion of eight consecutive "stopping operations" is "1/36", the proportion of four consecutive "stopping operations" is "33/36", and the proportion of three consecutive "stopping operations" is "36/36" (1+4+7+10+11=33 patterns). Note that patterns having a consecutive number smaller than three are not included in patterns that satisfy "80%/10 operations" or more.

Hence, in the "consecutive number-based learning" according to this embodiment, "a case in which the proportion of the "stopping operation" is predicted to reach or exceed "80%" when the number of pieces of operation information reaches ten" is estimated on the basis of the largest consecutive number of "stopping operations" included in the newest ten pieces of operation information. At this time, a probability of reaching or exceeding "80%" decreases steadily as the largest consecutive number decreases, reaches a maximum when the largest consecutive number is eight, reaches a minimum when the largest consecutive number is three, and is greater when the largest consecutive number is four than when the largest consecutive number is three. Meanwhile, the number of patterns included in each largest consecutive number is at a minimum (1/36) when the largest consecutive number is eight, at a maximum (36/36=100%) when the largest consecutive number is three, and comparatively large when the largest consecutive number is four (33/36≅92%). Hence, the largest consecutive number applied to the estimation is selected in consideration of these facts.

In this embodiment, any one of the largest consecutive numbers from eight to three described above is set as the "predetermined consecutive number" for use during reproducibility learning and the "predetermined consecutive number" for determining cancellation. Note that in the case of the "predetermined consecutive number" for use during reproducibility learning, the value of the "priority determination consecutive number" is set to be equal to or smaller than the value of the "normal determination consecutive number" so that a learning result indicating reproducibility is equally or more likely to be obtained. For example, in this embodiment, a "priority determination consecutive number (N2)" for use during reproducibility learning is set at three (the smallest consecutive number), whereas a "normal determination consecutive number (N1)" is set at four (the most frequent consecutive number). Further, in the case of the "predetermined consecutive number" for determining cancellation, the value of the "priority determination consecutive number" is set to be equal to or larger than the value of the "normal determination consecutive number" so that a determination to cancel learning is equally or less likely to be obtained. For example, in this embodiment, a "priority determination consecutive number (M2)" for determining cancellation is set at eight (the largest consecutive number), whereas a "normal determination consecutive number (M1)" is set at four (the most frequent consecutive number).

In consideration of the points described above, first, the "learning execution processing" performed by the operation information learning unit 33 will be described.

In a case where the "predetermined consecutive number" for use during reproducibility learning is set at four in the "consecutive number-based learning" of the "learning execution processing" performed by the operation information learning unit 33, a learning result is not set when the number of passages of the vehicle 10 through the "learning area" is three or less.

When the number of passages is four or more, on the other hand, it is learned that the "stopping operation" is reproducible within the "learning area" at a point where four "stopping operations" are obtained consecutively from the first to the fourth operations, as in pattern "22" of FIG. 4. When other operations are obtained twice in a row thereafter, as in pattern "22", the proportions at the fourth to sixth operations vary successively from "100%" to "80%" to "67%", but even though the proportion is below "80%" at the sixth operation, the fact that four consecutive "stopping operations" were performed does not change. In other words, it has already been estimated that "the likelihood of the proportion being equal to or greater than "80%" at the tenth operation is high", and therefore a learning result indicating that the "stopping operation" is reproducible is maintained regardless of variation in the proportion midway.

Further, for example, when other operations are obtained second and third but four consecutive "stopping operations" are obtained from the fourth to the seventh operations, as in pattern "1" of FIG. 4, the proportion of the "stopping operation" is "71%" at the seventh operation. Since four consecutive operations have been detected, however, it is estimated that "the likelihood of the proportion being equal to or greater than "80%" at the tenth operation is high", and therefore it is learned that the "stopping operation" is reproducible at the seventh operation.

On the other hand, even when the "stopping operation" is obtained at all operations apart from the fourth such that that the proportion is "86%" at the seventh operation, for example, as in pattern "19" of FIG. 4, the consecutive number has not yet reached four by the seventh operation, and therefore it is not estimated that "the likelihood of the proportion being equal to or greater than "80%" at the tenth operation is high". Hence, even when learning is continued at the end point of the seventh operation, a learning result is not obtained.

Next, the "learning cancellation processing" performed by the operation information learning unit 33 will be described.

In the "consecutive number-based determination" of the "learning cancellation processing" performed by the operation information learning unit 33, whether or not to cancel learning is determined on the basis of the number of consecutive "stopping operations" required for a proportion of the "stopping operation" that is lower than "80%" in the "registered operation information" of the "learning area" to reach or exceed "80%" thereafter. In other words, the consecutive number of "stopping operations" is equal to a further number of "stopping operations" required for a proportion that is currently lower than "80%" to reach or exceed "80%".

A graph 41 shown in FIG. 3 is a tabular graph sectioned into vertical columns and horizontal rows, wherein the number of passages by the vehicle 10 is shown in the vertical columns and the number of stops, or in other words the number of "stopping operations" is shown in the horizontal rows. Further, the graph 41 is sectioned substantially into left and right sections by a thick line, wherein the left side serves as an A side and the right side serves as a B side. In other words, the graph 41 shows numbers of "stopping operations" to the number of passages of the vehicle 10 through the "learning area", wherein the number, or in other words the consecutive number, of "stopping operations" subsequently required for the proportion of the "stopping operation" to reach or exceed "80%" is shown on the A side of the graph 41. Note that the B side of the graph 41 shows numbers of "other operations" that may subsequently occur, it being impossible to maintain the proportion of the "stopping operation" at or above "80%" when other operations occur consecutively in those numbers.

To describe the A side of the graph 41 in further detail, when the number of passages is two and the number of stops ("stopping operations") is one, for example, such that the proportion of the "stopping operation" is "50%" (=1/2), another three "stopping operations" are required for the proportion of the "stopping operation" to reach or exceed "80%" (⅘=80%). Further, when the number of passages is six and the number of stops is two, for example, such that the proportion of the "stopping operation" is "33%" (=2/6), another fourteen consecutive "stopping operations" are required for the proportion of the "stopping operation" to reach or exceed "80%" (16/20=80%).

Hence, the A side of the graph 41 shows the operation information required to set the current proportion of the "stopping operation" at "80%". However, the consecutive numbers shown on the A side have unrealistically large values. As a realistic value, for example, when the number of passages is two and the number of stops performed during the passages is one, the proportion of the "stopping operation" may reach "80%" by a fifth operation, which is smaller than ten, i.e. the upper limit of the "registered operation information". When learning in the "learning area" is continued in this case, a learning result may be obtained, and therefore it is determined that continuing learning is meaningful.

On the other hand, when the number of passages is six and the number of stops is two, for example, the proportion of the "stopping operation" cannot reach "80%" until a twentieth operation, which is larger than ten, i.e. the upper limit of the "registered operation information". Further, a requirement of fourteen or more subsequent "stopping operations", and moreover consecutive "stopping operations", is unrealistic. When learning in the "learning area" is continued in such cases, there is almost no possibility of obtaining a learning result, and therefore it is determined that continuing learning is meaningless. In other words, it is determined that learning in the "learning area" is to be canceled.

A value that is realistic as the number of consecutive "stopping operations" required for the current proportion of the "stopping operation" to reach or exceed "80%" is determined as the "predetermined consecutive number" for determining cancellation on the basis of the list 43 shown in FIG. 5. For example, a realistic consecutive number may be set at four (the most frequent consecutive number) on the basis of the list 43. In so doing, the operation information learning unit 33 can determine that learning in the "learning area" is to be canceled when the number of consecutive "stopping operations" required for the current proportion of the "stopping operation" to reach "80%" is larger than four on the graph 41 of FIG. 3. Note that as long as the "predetermined consecutive number" for determining cancellation is based on the list 43, selecting a value larger than eight or a value smaller than three as the "predetermined consecutive number" for determining cancellation is not appropriate.

Next, operation information learning will be described with reference to FIGS. 6 and 7.

When the "newest operation information" is detected and the "operation position information" is obtained by the operation information extraction unit 31, the information processing ECU 11 registers the "newest operation information" in relation to the "learning area" specified by the operation information learning unit 33 during the "learning start processing" or the "learning continuation processing". The information processing ECU 11 then performs the "learning execution processing". In other words, the information processing ECU 11 determines whether or not the position indicated by the "operation position information" is included in the "deceleration target area" (step S1 in FIG. 6). More specifically, when the "determination information" set by the position information processing unit 32 is at "normal", the position is determined not to be included in the "deceleration target area", and when the "determination information" is at "priority", the position is determined to be included in the "deceleration target area". Accordingly, the information processing ECU 11 determines whether to learn whether or not the "newest operation information" is reproducible using the "normal determination" or the "priority determination". Note that the "normal determination" processing of FIG. 6 and the "priority determination" processing of FIG. 7 differ from each other in the respective values of the "predetermined consecutive number" for use during reproducibility learning and the "predetermined consecutive number" for determining cancellation, but are similar in terms of a processing flow (a flowchart).

When "normal" is set as the "determination information" such that the position indicated by the "operation position information" is determined not to be included in the "deceleration target area" (NO in step S1 of FIG. 6), the information processing ECU 11 performs the "normal determination". Accordingly, the "predetermined consecutive number" for use during reproducibility learning and the "predetermined consecutive number" for determining cancellation are set respectively at the "normal determination consecutive numbers (N1, M1)". At this time, N1 serving as the "predetermined consecutive number" for use during reproducibility learning and M1 serving as the "predetermined consecutive number" for determining cancellation are both set at four.

Next, the information processing ECU 11 determines whether or not the number of times the vehicle 10 has passed through the "learning area" obtained on the basis of the "operation position information" is smaller than ten (Y=10) (step S10 in FIG. 6). In this embodiment, ten is the maximum number of pieces of operation information used for learning, and therefore only the ten newest pieces of operation information in the "learning area" are used during reproducibility learning.

Having determined that the number of passages through the "learning area" is not smaller than ten, or in other words equal to or greater than ten (NO in step S10 of FIG. 6), the information processing ECU 11 determines whether or not a stopping ratio serving as the proportion of the "stopping operation" equals or exceeds "80%" (X=80) (step S12 in FIG. 6). The stopping ratio is determined according to whether or not eight or more "stopping operations" are included in the ten newest pieces of operation information constituted by the operation information included in the "newest operation information" and the "registered operation information".

Having determined that the stopping ratio equals or exceeds "80%" (YES in step S12 of FIG. 6), the information processing ECU 11 learns that the "newest operation information" is "reproducible", and sets the "assistance subject operation" as the learning result (step S13 in FIG. 6). The information processing ECU 11 then performs setting to make the learning result usable during "green driving assistance", which is a vehicle operation for reducing a fuel consumption, or in other words performs setting such that driving assistance can be performed in relation to the same "learning area" on the basis of the learning result (step S20 in FIG. 6).

After determining that the stopping ratio is smaller than "80%" (NO in step S12 of FIG. 6), on the other hand, the information processing ECU 11 determines that the "newest operation information" is "not reproducible" (step S15 in FIG. 6), and therefore clears the learning result relating to the "learning area" and restarts new learning. In other words, the information processing ECU 11 performs the "learning cancellation processing" followed by the "learning start processing" in order to set a new "learning area" on the basis of currently detected "newest operation information" and "operation position information" and register the "newest operation information" in the "registered operation information" corresponding to the "learning area".

Further, after determining that the number of passages through the "learning area" is smaller than ten (YES in step S10 of FIG. 6), the information processing ECU 11 determines whether or not the number of consecutive "stopping operations" is four (N1=4) (step S11 in FIG. 6). After determining that the number of consecutive "stopping operations" is four or larger (YES in step S11 of FIG. 6), the information processing ECU 11 determines that the "newest operation information" is "reproducible", similarly to a case where "YES in step S12" is obtained, and sets the "assistance subject operation" as the learning result (step S13 in FIG. 6). Thus, the information processing ECU 11 performs the setting to make the learning result usable during the "green driving assistance" (step S20 in FIG. 6).

After determining that the number of consecutive "stopping operations" is not four or larger, or in other words smaller than four (NO in step S11 of FIG. 6), on the other hand, the information processing ECU 11 determines, on the basis of the "newest operation information" and the "registered operation information", whether or not more than four subsequent "stopping operations" are required to satisfy a stopping ratio of "80%" (step S14 in FIG. 6). After determining that more than four "stopping operations" are required to achieve a stopping ratio of "80%" or more (YES in step S14 of FIG. 6), the information processing ECU 11 determines that the "newest operation information" is "not reproducible", similarly to a case where "NO in step S12" is obtained (step S15 in FIG. 6). Accordingly, the information processing ECU 11 clears the learning result relating to the "learning area" and restarts new learning (step S21 in FIG. 6). After determining, on the other hand, that more than four subsequent "stopping operations" are not required to achieve a stopping ratio of "80%" or more, or in other words that four or fewer "stopping operations" are required (NO in step S14 of FIG. 6), the information processing ECU 11 determines that reproducibility learning is to be continued in relation to the "learning area" (step S16 in FIG. 6). In other words, the information processing ECU 11 continues learning in relation to the "learning area" even though the "assistance subject operation" has not been set in the "learning area" and therefore the driving assistance signal and so on cannot be obtained (step S22 in FIG. 6).

When, on the other hand, "priority" is set as the "determination information" such that the position indicated by the "operation position information" is determined to be included in the "deceleration target area" (YES in step S1 of FIG. 6), the information processing ECU 11 performs "priority determination" processing. Accordingly, the "predetermined consecutive number" for use during reproducibility learning and the "predetermined consecutive number" for determining cancellation are set respectively at the "priority determination consecutive numbers (N2, M2)". At this time, N2 serving as the "predetermined consecutive number" for use during reproducibility learning and M2 serving as the "predetermined consecutive number" for determining cancellation are set at three and eight, respectively.

Figure 7:
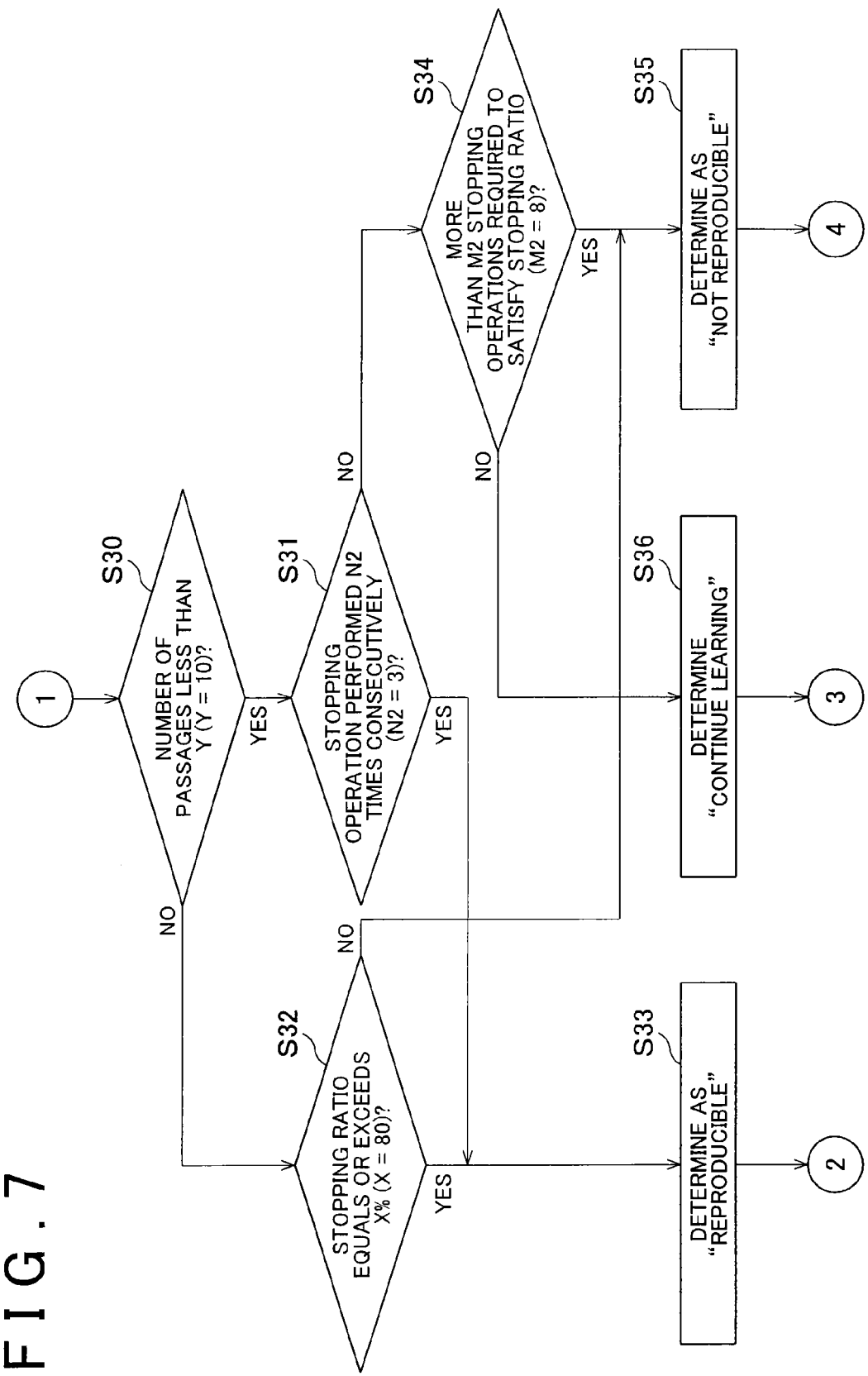
FIG. 7 is a flowchart showing procedures of a remainder of the processing relating to the learning shown in FIG. 6.

Next, similarly to step S10, the information processing ECU 11 determines whether or not the number of times the vehicle 10 has passed through the "learning area" is smaller than ten (step S30 in FIG. 7).

Having determined that the number of passages by the vehicle 10 through the "learning area" is not smaller than ten, or in other words the number of passages by the vehicle 10 through the "learning area" is equal to or greater than ten (NO in step S30 of FIG. 7), the information processing ECU 11 determines whether or not the stopping ratio equals or exceeds "80%" (step S32 in FIG. 7), similarly to step S12.

Having determined that the stopping ratio equals or exceeds "80%" (YES in step S32 of FIG. 7), the information processing ECU 11 learns that the corresponding operation information is "reproducible" (step S33 in FIG. 7), similarly to step S13, and performs setting to make the learning result usable during the "green driving assistance" (step S20 in FIG. 6).

After determining that the stopping ratio is smaller than "80%" (NO in step S32 of FIG. 7), on the other hand, the information processing ECU 11 determines that the corresponding operation information is "not reproducible" (step S35 in FIG. 7), similarly to step S15, and therefore clears the learning result and restarts new learning (step S21 in FIG. 6).

Further, after determining that the number of passages is smaller than ten (YES in step S30 of FIG. 7), the information processing ECU 11 determines whether or not the number of consecutive "stopping operations" is three (N2=3) (step S31 in FIG. 7). After determining that the number of consecutive "stopping operations" is three or larger (YES in step S31 of FIG. 7), the information processing ECU 11 determines that the corresponding operation information is "reproducible" (step S33 in FIG. 7), similarly to a case where "YES in step S32" is obtained, and performs setting to make the learning result usable during the "green driving assistance" (step S20 in FIG. 6).

After determining that the number of consecutive deceleration operations is not three or larger (NO in step S31 of FIG. 7), on the other hand, the information processing ECU 11 determines whether or not more than eight (M2=8) subsequent "stopping operations" are required to satisfy the stopping ratio (step S34 in FIG. 7). Having determined that more than eight subsequent "stopping operations" are required to set the stopping ratio at or above "80%" (YES in step S34 of FIG. 7), the information processing ECU 11 determines that the corresponding operation information is "not reproducible" (step S35 in FIG. 7), similarly to a case where "NO in step S32" is obtained. The information processing ECU 11 then clears the learning result and restarts new learning. After determining that more than eight "stopping operations" are not required, or in other words eight or fewer "stopping operations" are required, to set the stopping ratio at or above "80%" (NO in step S34 of FIG. 7), on the other hand, the information processing ECU 11 determines that reproducibility learning is to be continued in relation to the "learning area" (step S36 in FIG. 7). As a result, the information processing ECU 11 continues learning in relation to the "learning area" (step S22 in FIG. 6), whereupon the learning processing is terminated.

(Actions)

Figure 8:
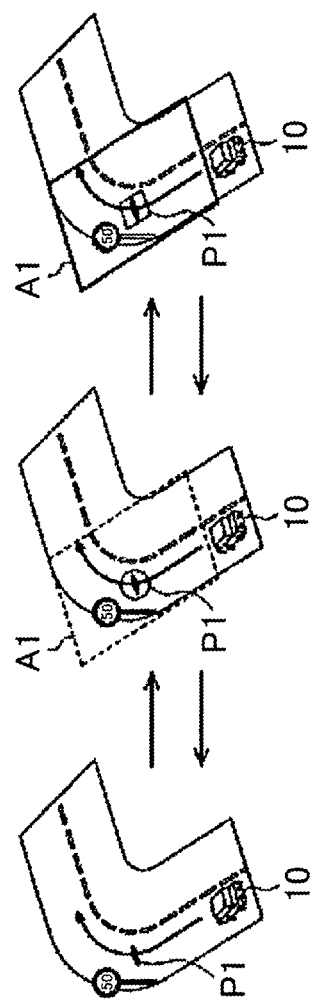

Next, actions of the vehicle information processing apparatus according to this embodiment will be described with reference to FIG. 8. Here, a case in which the vehicle 10 passes through a curved road will be used as an example, and learning and driving assistance implemented in relation to a "deceleration operation" performed on the curved road will be described. FIG. 8A is a view showing a condition in which the vehicle 10 is passing through the curved road for the first time or the like, and therefore a "learning area A1" has not yet been set. FIG. 8B is a view showing a condition in which learning has been performed in relation to the "learning area A1" but driving assistance has not yet been provided. FIG. 8C is a view showing a condition in which learning has been performed in relation to the "learning area A1" and driving assistance has been provided.

When the vehicle 10 executes a "deceleration operation" while traveling at a constant speed, the information processing ECU 11 detects the executed "deceleration operation" and an "operation position P1" at that time, and retrieves a "learning area" including the "operation position P1" from the database 12A.

When, at this time, the vehicle 10 is passing through the location for the first time, as shown in FIG. 8A, a "learning area" is not retrieved, and therefore the information processing ECU 11 sets a new "learning area A1" including the "operation position P1", and registers the "learning area A1" in the database 12A in association with the "deceleration operation", as shown in FIG. 8B.

When the vehicle 10 has passed through the location previously, on the other hand, as shown in FIG. 8B, the information processing ECU 11 registers the "deceleration operation" as the "newest operation information" in association with the "learning area A1" obtained by retrieval. At this time, the information processing ECU 11 learns the reproducibility of the "deceleration operation" on the basis of the predetermined consecutive number for use during reproducibility learning, and having determined that the "deceleration operation" is reproducible, sets the "assistance subject operation" in the "learning area A1" and confirms the "learning area A1" as an assistance subject area, as shown in FIG. 8C. In other words, when the number of consecutive "deceleration operations" executed by the vehicle 10 equals or exceeds the predetermined consecutive number for use during reproducibility learning, the "assistance subject operation" is set in the corresponding "learning area A1", and the vehicle 10 is provided with information required for driving assistance. More specifically, the vehicle 10 obtains driving assistance information from the "learning area A1" detected on the basis of the current position, and performs driving assistance based on the driving assistance information. Hence, according to this embodiment, by employing a consecutive number in the reproducibility determination, a learning result can be output even when the number of passages through the "learning area A1" is small.

However, when it is determined by the information processing ECU 11 while learning the reproducibility of the "deceleration operation" that the "deceleration operation" is not reproducible, an "assistance candidate operation" is set in the "learning area A1", whereupon learning in the "learning area A1" is continued. At this time, the vehicle 10 does not obtain the driving assistance information from the "learning area A1" detected on the basis of the current information. According to this embodiment, a consecutive number is used in the reproducibility determination, and therefore a learning result can be output even when the number of passages through the "learning area A1" is small. As a result, a period in which the driving assistance information cannot be obtained is short.

Incidentally, in a case where the "learning area A1" is set and reproducibility learning is started, as shown in FIG. 8B, but the "deceleration operation" is not detected in the "learning area A1" thereafter, it is determined that learning is to be canceled on the basis of the predetermined consecutive number for determining cancellation. Accordingly, learning is canceled and the "learning area A1" is deleted, as shown in FIG. 8A. More specifically, reproducibility learning in relation to the "learning area A1" of the vehicle 10 is canceled, and the information relating to the "learning area A1" is deleted such that the area secured in the database 12A for learning in the "learning area A1" is freed. Note that in this embodiment, whether or not to cancel learning is determined on the basis of the predetermined consecutive number for determining cancellation, and therefore the determination as to whether or not to cancel learning can be performed favorably even when the number of passages through the "learning area A1" is small. Furthermore, a used amount of the database 12A can be reduced.

It is likewise determined that learning is to be canceled on the basis of the predetermined consecutive number for determining cancellation in a case where driving assistance in the "learning area A1" is started, as shown in FIG. 8C, but the "deceleration operation" is not detected in the "learning area A1" thereafter. Note that in this embodiment, the information processing ECU 11 determines whether or not to cancel learning using the ten newest pieces of operation information even when the number of past passages is large. In so doing, the information processing ECU 11 can cancel learning early, as shown in FIGS. 8A and 8B, regardless of the number of past passages when the vehicle operation in the "learning area A1" changes and the changed vehicle operation is performed consecutively a number of times corresponding to the "predetermined consecutive number" for determining cancellation.

With the vehicle information processing apparatus and vehicle information processing method according to this embodiment, as described above, following effects are obtained.

(1) The reproducibility of the "operation information" is learned on the basis of the number of times an identical type of operation information (a "stopping operation", for example) is obtained consecutively in an identical location ("learning area"), or in other words a consecutive number of acquisitions (a consecutive number) of the "stopping operation", for example, in the "learning area", and therefore the number of pieces of operation information required for learning in the "learning area" can be set at a number corresponding to the consecutive number. When a vehicle operation performed by the driver is modified appropriately in accordance with variation in the habits of the driver, variation in the road shape, and so on, for example, a number of pieces of operation information that must be obtained before the modified vehicle operation is learned as a valid vehicle operation, or in other words before the vehicle operation (the "stopping operation") is set as the learning result (the "assistance subject operation"), corresponds to the consecutive number. Therefore, the number of pieces of operation information that must be obtained to learn the modified operation information can be reduced in comparison with a case where learning is performed on the basis of a proportion of accumulated operation information obtained in the past. As a result, a delay in reflecting appropriately modified operation information in the learning result due to the effect of previously accumulated operation information is prevented. Hence, by performing learning on the basis of the number of consecutive acquisitions, the reproducibility of appropriate operation information is learned smoothly in a short period of time even in the case of operation information obtained for the first time and appropriately modified operation information. In other words, a period required for the information processing ECU 11 to start driving assistance in relation to operation information obtained for the first time or appropriately modified operation information can be shortened, and as a result, smooth driving assistance can be provided.

(2) A consecutive number, rather than a proportion that is affected by accumulated operation information, is used for the learning and determination. It is typically believed that newer operation information reflects current circumstances more accurately and is therefore of higher importance, while older operation information is more likely to deviate from current circumstances and is therefore of lower importance. Further, highly reproducible operation information is more likely to be obtained consecutively from the first time the operation information is obtained. Hence, even when old operation information is not used or the effect thereof is reduced during the consecutive number-based reproducibility learning, an appropriate reproducibility learning result is maintained.

(3) Furthermore, when proportion-based learning is performed, an accumulation of a predetermined number of pieces (ten pieces, for example) of operation information is required as a parameter, but by employing a consecutive number (four, for example) as a determination reference, the reproducibility can be learned at a point where the consecutive number is reached regardless of whether or not the predetermined number of pieces of operation information has accumulated. For example, by setting the consecutive number at a "number at which it is estimated that the proportion serving as the determination reference would be reached at the predetermined number during proportion-based learning" (four, for example), the reproducibility can be learned on the basis of a smaller number of pieces of operation information than the predetermined number. Note that by performing a consecutive number-based determination when the predetermined number has not been reached, the likelihood of reaching the proportion serving as the determination reference when the number of pieces of operation information reaches the predetermined number increases in comparison with a case where the determination is made using a proportion based on a total number up to that point.

(4) Moreover, the number of pieces of operation information required for learning can be suppressed to the consecutive number, and therefore an amount of information required for learning can be reduced. In other words, a used volume of the database 12A can be reduced.

(5) The "learning area" is set on the basis of the operation information, and therefore the "learning area" in which reproducibility learning is to be performed can be set with greater flexibility. Further, the "learning area" is set as a "learning area" constituted by a predetermined range that includes the position indicated by the "operation position information" in which the operation information was obtained, and therefore a shift in the position of the vehicle 10 due to a road condition, positional deviation due to a position detection precision, and so on can be dealt with favorably. Furthermore, since the predetermined range serving as the "learning area" is handled as a single location, a situation in which a large number of reproducibility learning locations are set in proximity to each other within a small range is prevented from occurring, and therefore an increase in information is suppressed.

(6) When a vehicle operation of an identical type to a specific required vehicle operation (the "stopping operation", for example) is learned in a location (the "deceleration target area", for example) requiring the specific vehicle operation, the consecutive number (the "predetermined consecutive number" for use during reproducibility learning) used to learn the reproducibility of the corresponding operation information may be modified. For example, in a "deceleration target area" requiring a temporary stop, where the driver must perform a stopping operation, the "predetermined consecutive number" for use during reproducibility learning ($N2=3$) used to learn the reproducibility of the "stopping operation" can be made smaller than the "predetermined consecutive number" for use during reproducibility learning ($N1=4$) used in locations other than the "deceleration target area".

(7) When the number of passages through an identical location ("learning area") reaches a predetermined number (ten, for example) at which proportion-based learning is possible, the reproducibility of the operation information is learned on the basis of the predetermined number of newest passages. Hence, learning is performed on the basis of a number of pieces of operation information corresponding to the predetermined number even during proportion-based learning, and therefore the number of pieces of operation information used for learning is suppressed.

(8) Information used to assist the "deceleration operation", which is the operation required as the vehicle operation, can be provided. In a hybrid vehicle, an EV, and so on in particular, an amount of regenerative power can be increased by extending a period in which power is regenerated on the basis of deceleration assistance, and as a result, an improvement in energy use efficiency can be obtained.

(9) The vehicle information processing apparatus is installed in the vehicle 10, and therefore the assistance information provided by the vehicle information processing apparatus can be used by the vehicle 10 easily.

(10) Information required for driving assistance is provided when a vehicle operation of an identical type (the "deceleration operation", for example) is executed in an identical location ("learning area") consecutively at least a predetermined number of times, or in other words on the basis of a number of consecutive vehicle operations of an identical type performed in an identical location. In a case where a vehicle operation performed by the driver is modified appropriately in accordance with variation in the habits of the driver, variation in the road shape, and so on, for example, driving assistance is performed when the modified vehicle operation is executed consecutively at least the predetermined number of times. Accordingly, the number of vehicle operations that must be obtained before driving assistance is started can be reduced in comparison with a case where driving assistance is performed on the basis of a proportion of accumulated past information. As a result, a delay in the driving assistance performed in relation to the appropriately modified vehicle operation due to the effects of previously accumulated vehicle operations and so on is prevented. Hence, by providing driving assistance based on a number of consecutive executions, driving assistance can be provided in relation to an appropriate vehicle operation in a short period of time even in the case of a vehicle operation obtained for the first time or an appropriately modified vehicle operation.

(11) A consecutive number, rather than a proportion that is affected by past accumulated vehicle operations, is used for the learning and determination. It is typically believed that newer vehicle operations reflect current circumstances more accurately and are therefore of higher importance, while older vehicle operations are more likely to deviate from current circumstances and are therefore of lower importance. Further, highly reproducible vehicle operations are more likely to be executed consecutively from the first time the vehicle operation is executed. Hence, even when information relating to old vehicle operations is not used or the effect thereof is reduced during consecutive number-based driving assistance, the provision of appropriate driving assistance information is maintained.

(12) Furthermore, when the driving assistance information is provided on the basis of a proportion, a predetermined number of vehicle operations (ten, for example) are required as a parameter, but by setting a consecutive number (four, for example) as the determination reference, the driving assistance information can be provided at the point where the consecutive number is reached regardless of whether or not the predetermined number of vehicle operations has been executed. For example, by setting the consecutive number at a "number at which it is estimated that the proportion serving as the determination reference will be reached at the predetermined number" (four, for example), the driving assistance information can be provided on the basis of a smaller number of vehicle operations than the predetermined number. Note that by determining whether or not driving assistance is required on the basis of a consecutive number when the predetermined number has not been reached, the likelihood of reaching the proportion serving as the determination reference for providing driving assistance when the number of vehicle operations reaches the predetermined number increases in comparison with a case where the proportion is estimated on the basis of a total number up to that point.

(13) Moreover, the number of vehicle operations that must be executed in order to provide the driving assistance information is suppressed to the consecutive number, and therefore the number of pieces of information accumulated in relation to the vehicle operation can be reduced.

Other Embodiments

Note that the embodiment described above may also be implemented as follows.

Figure 9:
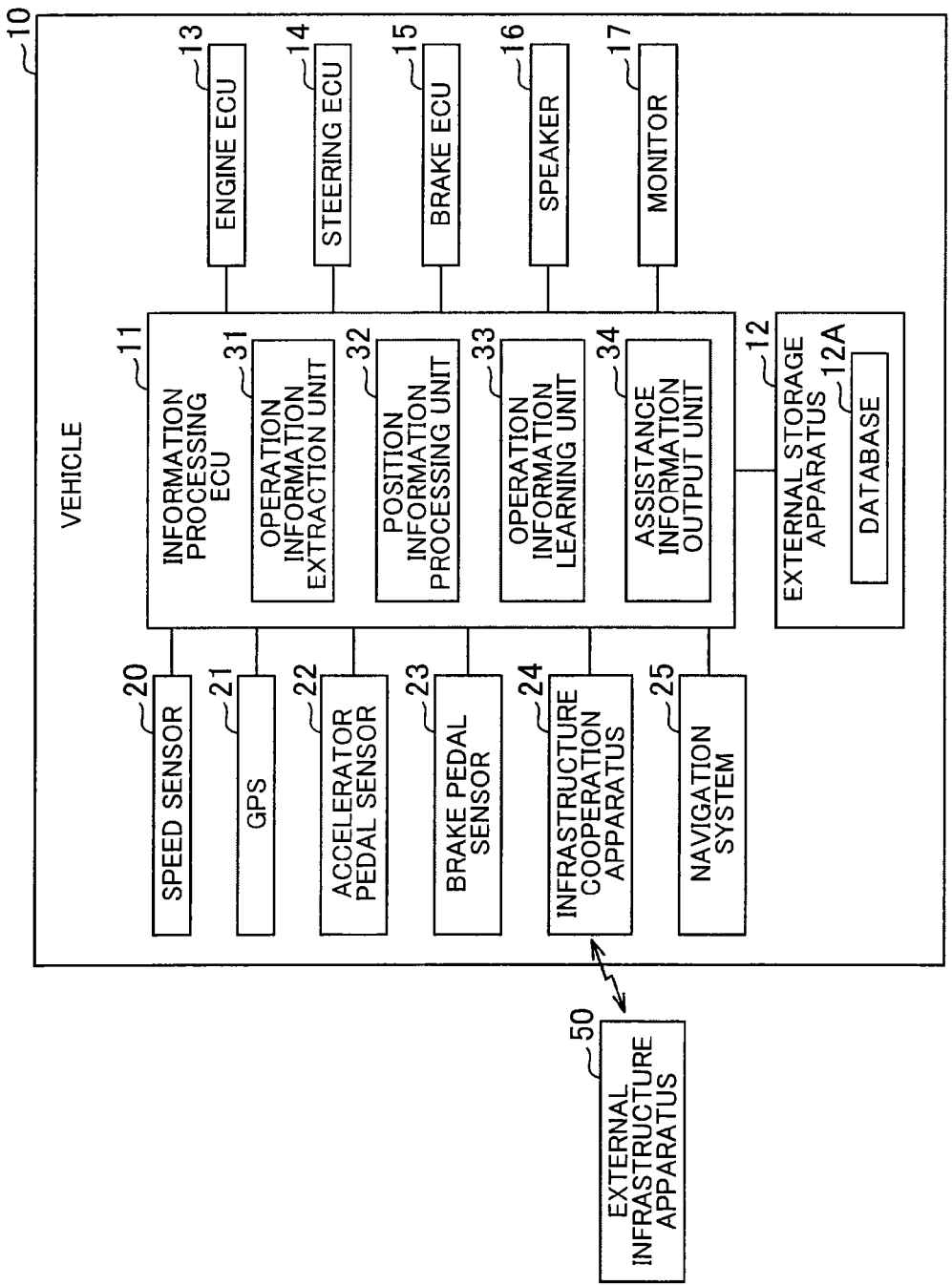
FIG. 9 is a schematic block diagram showing a configuration of another specific embodiment of the vehicle information processing apparatus according to the invention.

In the above embodiment, a case in which the "deceleration target area" is registered in the database 12A was described. The invention is not limited thereto, however, and the deceleration target area may be obtained from a navigation system or an external infrastructure apparatus. As shown in FIG. 9, for example, when a navigation system 25 is connected to the information processing ECU 11 of the vehicle 10, the information processing ECU 11 may obtain temporary stops, intersections, railway crossings, curves, and the like as "deceleration target areas" on the basis of road data included in road map information installed in the navigation system 25. Further, when an infrastructure cooperation apparatus 24 connected to the information processing ECU 11 is installed in the vehicle 10, the "deceleration target area" may be obtained on the basis of road-related information or the like transmitted from an external infrastructure apparatus 50 disposed on a road. As a result, the "deceleration target area" is registered in the database 12A in advance, leading to a reduction in the labor required to manage the database 12A to a newest condition. Furthermore, a "deceleration target area" can be set likewise in relation to a location not included in the database 12A, leading to an improvement in the convenience of the vehicle information processing apparatus.

Figure 10:
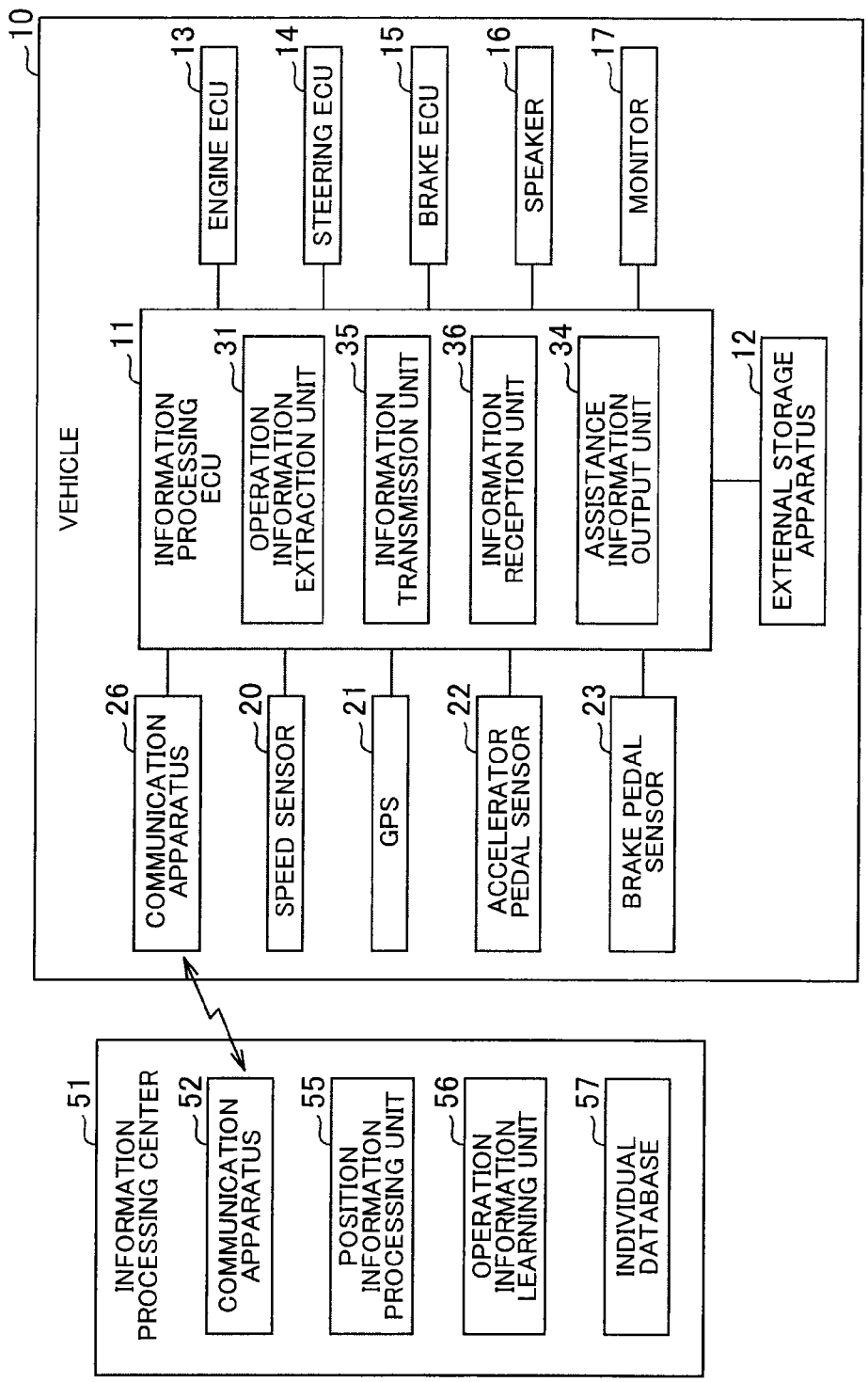
FIG. 10 is a schematic block diagram showing a configuration of a further specific embodiment of the vehicle information processing apparatus according to the invention.

In the above embodiment, a case in which the reproducibility of the vehicle operation within the "learning area" is learned by the information processing ECU 11 of the vehicle 10 was described. However, the invention is not limited thereto, and the reproducibility of the vehicle operation within the "learning area" may be learned by an apparatus on the exterior of the vehicle. As shown in FIG. 10, for example, an information transmission unit 35 and an information reception unit 36 are provided in the information processing ECU 11, which does not have an operation information learning unit, and a communication apparatus 26 connected to the information processing ECU 11 is provided in the vehicle 10. Further, an information processing center 51 is provided on the outside of the vehicle 10, and the information processing center 51 is provided with a communication apparatus 52 capable of communicating with the vehicle 10, a position information processing unit 55 corresponding to the position information processing unit 32 of the above embodiment, an operation information learning unit 56 corresponding to the operation information learning unit 33 of the above embodiment, and an individual database 57 corresponding to the database 12A. At this time, the information processing ECU 11 transmits the "operation position information" and the "newest operation information" detected by the operation information extraction unit 31 to the information processing center 51, and in the information processing center 51, a "learning area" based on the "operation position information" is created or obtained, the "newest operation information" in the "learning area" is registered, the reproducibility thereof is learned, and so on. The assistance information output unit 34 obtains the existence of the "learning area" and the "assistance subject operation" by searching the individual database 57 of the information processing center 51 on the basis of the current position. Further, when "newest operation position information" is not provided by the operation information extraction unit 31 even though a "learning area" has been detected, the assistance information output unit 34 provides the information processing center 51 with information such as "no operation". Thus, the reproducibility of the operation information in relation to the "learning area" can also be learned by an external apparatus. As a result, the freedom of a system configuration of the vehicle information processing apparatus can be improved.

In the above embodiment, a case focusing on driving assistance provided in relation to a "stopping operation" or a "deceleration operation" performed by the driver was described. The invention is not limited thereto, however, and the driving assistance may be provided in relation to an "acceleration operation" or a "steering operation" performed by the driver. Likewise with an "acceleration operation" or a "steering operation", by selecting the "acceleration operation" or the "steering operation" as the "assistance subject operation" in the "learning area", a driving assistance signal can be output in relation to the corresponding operation. Therefore, by performing control corresponding to respective driving assistance signals obtained by the engine ECU, the steering ECU, and the brake ECU, driving assistance can be provided likewise in relation to these driving assistance signals.

In the above embodiment, a case in which the "newest operation information" is broadly divided into two types of information, namely information based on a "stopping operation" performed by the driver and other information, was described. The invention is not limited thereto, however, and the operation information may be divided into many types. Likewise when the operation information is divided into many types, by selecting operation information of an identical type having the largest number of pieces as the "assistance candidate operation", driving assistance can be provided in relation to a specific vehicle operation of an identical type.

In the above embodiment, a case in which the "assistance candidate operation" is selected on the basis of the "registered operation information" was described. The invention is not limited thereto, however, and the "assistance candidate operation" may be determined in advance. In so doing, the design freedom of the vehicle information processing apparatus can be improved.

In the above embodiment, a case in which "past operation information" exceeding the upper limit number (ten pieces) is deleted from the "registered operation information" was described. The invention is not limited thereto, however, and the "past operation information" exceeding the upper limit number need not be deleted. In so doing, it is possible to respond to a case in which the number of pieces of "operation information" used during learning is modified to a larger value or the like.

In the above embodiment, a case in which the "registered operation information" used by the operation information learning unit 33 for learning corresponds only to a maximum of the newest ten pieces of operation information was described. The invention is not limited thereto, however, and the maximum number of pieces of "registered operation information", or in other words the so-called upper limit number, used during learning may be smaller or larger than ten.

In the above embodiment, a case in which the "proportion-based learning" and the "proportion-based determination" are not performed when the number of pieces of operation information included in the "registered operation information" is smaller than ten was described. The invention is not limited thereto, however, and the "proportion-based learning" and "proportion-based determination" may be performed even when number of pieces of operation information included in the "registered operation information" is smaller than ten. In this case, the number of pieces of operation information used when performing the "consecutive number-based learning" and the "consecutive number-based determination" may be adjusted in accordance with the number of pieces of operation information used when performing the "proportion-based learning" and the "proportion-based determination". As a result, the design freedom of the vehicle information processing apparatus is improved.

In the above embodiment, a case in which the "consecutive number-based learning" and the "consecutive number-based determination" are performed when the number of pieces of operation information included in the "registered operation information" is smaller than ten was described. The invention is not limited thereto, however, and the "consecutive number-based learning" and "consecutive number-based determination" may be performed when number of pieces of operation information included in the "registered operation information" is ten or larger than ten. As a result, the design freedom of the vehicle information processing apparatus is improved.

In the above embodiment, a case in which the "deceleration target area" is set was described. The invention is not limited thereto, however, and another target area may be set. For example, an "acceleration target area" may be set, and in this case, the "acceleration target area" and an "acceleration operation" may be applied in place of the "deceleration target area" and the "deceleration operation", respectively. As a result, the design freedom of the vehicle information processing apparatus is improved.

In the above embodiment, a case in which a determination is made as to whether or not a "learning area" is a "deceleration target area" was described. The invention is not limited thereto, however, and the determination as to whether or not the "learning area" is a "deceleration target area" need not be made. In this case, reproducibility learning and so on using the "normal determination" may be performed in relation to all "learning areas". As a result, the design freedom of the vehicle information processing apparatus is improved.

In the above embodiment, a case in which the "learning execution processing" and the "learning cancellation processing" are provided was described. The invention is not limited thereto, however, and only one of the "learning execution processing" and the "learning cancellation processing" need be provided. As a result, the design freedom of the vehicle information processing apparatus is improved.

10 vehicle
11 information processing ECU
12 external storage apparatus
12A database
13 engine ECU
14 steering ECU
15 brake ECU
16 speaker
17 monitor
20 speed sensor
21 GPS
22 accelerator pedal sensor
23 brake pedal sensor
24 infrastructure cooperation apparatus
25 navigation system
26 communication apparatus
31 operation information extraction unit
32 position information processing unit
33 operation information learning unit
34 assistance information output unit
35 information transmission unit
36 information reception unit
40, 41 graphs
42, 43 lists
50 external infrastructure apparatus
51 information processing center
52 communication apparatus
55 position information processing unit
56 operation information learning unit
57 individual database

The invention claimed is:

1. A vehicle information processing apparatus comprising:
an electronic control unit (ECU) configured to
obtain operation information obtained in response to respective vehicle operations performed by a driver in association with locations in which the vehicle operations have been respectively performed;
determine whether or not there is a reproducibility f an identical type of operation information in an identical location in accordance with a number of times the identical type of operation information is obtained consecutively in the location among the operation information obtained equal to or less than a predetermined number of times; and
perform driving assistance when there is reproducibility of the identical type of operation information in the identical location,
wherein when a number of passages through an identical location exceeds a predetermined number, the ECU is configured to learn the reproducibility of the operation information on the basis of a proportion of the number of times operation information of an identical type is obtained in the predetermined number of newest passages.

2. The vehicle information processing apparatus according to claim 1, wherein the location is set as a location constituted by a predetermined range that includes a location in which the operation information is obtained for a first time.

3. The vehicle information processing apparatus according to claim 1, e location is a location in which a specific vehicle operation is required, the ECU is configured to modify the number of times operation information of an identical type to the specific vehicle operation is obtained consecutively, which is used to learn the reproducibility of the operation information.

4. The vehicle information processing apparatus according to claim 1, wherein the operation information is information obtained on the basis of a deceleration operation performed on a vehicle by the driver.

5. The vehicle information processing apparatus according to claim 1, wherein the vehicle information processing apparatus is installed in a vehicle.

6. A vehicle information processing apparatus comprising:
an electronic control unit (ECU) configured to
provide information required for driving assistance on the basis of a vehicle operation performed by a driver when an identical type of vehicle operation is executed by the driver consecutively a first predetermined number of times in an identical location and the vehicle operation has been executed equal to or less than a second predetermined number of times, and
perform the driving assistance based on the information required for the driving assistance.

7. A vehicle information processing method in which operation information obtained in response to respective vehicle operations performed by a driver is learned in association with locations in which the vehicle operations have been respectively performed, the vehicle information processing method comprising:

counting, using an electronic control unit (ECU), a number of times an identical type of operation information is obtained consecutively in an identical location;
determining, using the ECU, whether or not there is a reproducibility of the identical type of operation information in the location in accordance with the counted number of times; and
performing, using the ECU, driving assistance when there is reproducibility of the identical type of operation information in the location,
wherein reproducibility is determined when the counted number of times the identical type of operation information obtained consecutively in the location is greater than a first predetermined number of times, and when the vehicle operation has been executed equal to or less than a second predetermined number of times.

8. The vehicle information processing method according to claim 7, further comprising setting, using the ECU, the location as a location constituted by a predetermined range that includes a location in which the operation information is obtained for a first time prior to counting the number of times the identical type of operation information is obtained consecutively.

9. The vehicle information processing method according to claim 7, further comprising, on the condition that the location is a location in which a specific vehicle operation is required, modifying, using the ECU, the number of times operation information of an identical type to the specific vehicle operation is obtained consecutively, which is used to learn the reproducibility of the operation information.

10. The vehicle information processing method according to claim 7, wherein, on the condition that a number of passages through an identical location exceeds a predetermined number, the reproducibility of the operation information is determined on the basis of a proportion of the number of times operation information of an identical type is obtained in the predetermined number of newest passages.

11. The vehicle information processing method according to claim 7, wherein a deceleration operation performed on a vehicle by the driver is obtained as the operation information.

12. The vehicle information processing method according to claim 7, wherein the vehicle information processing method is performed in the vehicle.

* * * * *